United States Patent
Padmanabhan et al.

(10) Patent No.: US 11,144,335 B2
(45) Date of Patent: *Oct. 12, 2021

(54) SYSTEM OR METHOD TO DISPLAY BLOCKCHAIN INFORMATION WITH CENTRALIZED INFORMATION IN A TENANT INTERFACE ON A MULTI-TENANT PLATFORM

(71) Applicant: salesforce.com, inc., San Francisco, CA (US)

(72) Inventors: Prithvi Krishnan Padmanabhan, San Ramon, CA (US); Andrew Conn, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,264

(22) Filed: Jan. 30, 2020

(65) Prior Publication Data
US 2021/0240498 A1      Aug. 5, 2021

(51) Int. Cl.
*G06F 3/048*      (2013.01)
*G06F 9/451*      (2018.01)
(Continued)

(52) U.S. Cl.
CPC ............ *G06F 9/451* (2018.02); *G06F 3/0486* (2013.01); *G06F 16/2246* (2019.01); *G06F 16/27* (2019.01)

(58) Field of Classification Search
CPC ...... G06F 9/451; G06F 16/27; G06F 16/2246; G06F 3/0486
See application file for complete search history.

(56) References Cited

U.S. PATENT DOCUMENTS 5,634,053 A * 5/1997 Noble ................. G06F 16/2471
6,333,929 B1   12/2001 Drottar et al.
(Continued)

FOREIGN PATENT DOCUMENTS

WO   2016/161073 A1   10/2016
WO   2018/007827 A1   1/2018
(Continued)

OTHER PUBLICATIONS

Azaria et al., "MedRec: Using Blockchain for Medical Data Access and Permission Managemen", 2016 2nd International Conference on Open and Big Data, IEEE, 2016, pp. 25-30.
(Continued)

*Primary Examiner* — Rashawn N Tillery
(74) *Attorney, Agent, or Firm* — Nicholson, De Vos, Webster & Elliott, LLP

(57) ABSTRACT

A method and system that generates a user interface with information from a decentralized data management system and information from a centralized data management system. The method including retrieving a layout for the user interface, determining metadata for the decentralized data management system, requesting the information from the centralized data management system identified by the layout via a query, accessing the information from the decentralized data management system by indexing, and generating and populating the user interface with the information from the centralized data management system and the decentralized data management system.

20 Claims, 13 Drawing Sheets

(51) Int. Cl.
*G06F 16/27* (2019.01)
*G06F 16/22* (2019.01)
*G06F 3/0486* (2013.01)

(56) References Cited

U.S. PATENT DOCUMENTS

| | | | |
|---|---|---|---|
| 7,730,478 | B2 | 6/2010 | Weissman |
| D768,690 | S | 10/2016 | Conn |
| 9,690,822 | B2 | 6/2017 | Roy-Faderman |
| D800,148 | S | 10/2017 | Conn |
| 10,505,726 | B1 | 12/2019 | Andon et al. |
| 10,521,196 | B1 | 12/2019 | Wang et al. |
| 10,521,780 | B1 | 12/2019 | Hopkins et al. |
| 10,541,821 | B2 | 1/2020 | Sjöblom et al. |
| 10,585,657 | B2* | 3/2020 | Padmanabhan ....... H04L 9/0891 |
| 10,783,164 | B2* | 9/2020 | Snow ................... G06Q 20/382 |
| 10,901,974 | B2* | 1/2021 | Padmanabhan ....... H04L 9/0637 |
| 2002/0077998 | A1 | 6/2002 | Andrews et al. |
| 2007/0050324 | A1* | 3/2007 | Trinkel ................ G06Q 10/107 |
| 2007/0297353 | A1* | 12/2007 | Habetha ................ H04L 1/1607 |
| | | | 370/310 |
| 2008/0066165 | A1 | 3/2008 | Rosenoer |
| 2009/0187588 | A1* | 7/2009 | Thambiratnam ..... G06F 16/134 |
| 2013/0041934 | A1 | 2/2013 | Annamalaisami et al. |
| 2016/0027229 | A1 | 1/2016 | Spanos et al. |
| 2016/0092872 | A1 | 3/2016 | Prakash et al. |
| 2016/0148251 | A1 | 5/2016 | Thomas et al. |
| 2017/0005804 | A1 | 1/2017 | Zinder |
| 2017/0046526 | A1 | 2/2017 | Chan et al. |
| 2017/0046638 | A1 | 2/2017 | Chan et al. |
| 2017/0046693 | A1 | 2/2017 | Haldenby et al. |
| 2017/0085545 | A1 | 3/2017 | Lohe et al. |
| 2017/0103167 | A1 | 4/2017 | Shah |
| 2017/0221052 | A1 | 8/2017 | Sheng et al. |
| 2017/0295023 | A1 | 10/2017 | Madhavan et al. |
| 2017/0324711 | A1 | 11/2017 | Feeney et al. |
| 2017/0337534 | A1 | 11/2017 | Goeringer et al. |
| 2017/0364549 | A1 | 12/2017 | Abalos |
| 2018/0006831 | A1 | 1/2018 | Toll et al. |
| 2018/0026505 | A1 | 1/2018 | Galmiche et al. |
| 2018/0088928 | A1 | 3/2018 | Smith et al. |
| 2018/0191503 | A1 | 7/2018 | Alwar et al. |
| 2018/0262505 | A1 | 9/2018 | Ligatti |
| 2018/0268504 | A1* | 9/2018 | Paolini-Subramanya ................... |
| | | | G06Q 20/3823 |
| 2018/0365686 | A1 | 12/2018 | Kondo |
| 2019/0014176 | A1 | 1/2019 | Tormasov et al. |
| 2019/0019090 | A1 | 1/2019 | Chacko et al. |
| 2019/0028276 | A1 | 1/2019 | Madhavan et al. |
| 2019/0035018 | A1 | 1/2019 | Nolan et al. |
| 2019/0050855 | A1 | 2/2019 | Martino et al. |
| 2019/0058709 | A1 | 2/2019 | Kempf et al. |
| 2019/0087598 | A1 | 3/2019 | Adkins et al. |
| 2019/0102423 | A1 | 4/2019 | Little et al. |
| 2019/0109713 | A1 | 4/2019 | Clark et al. |
| 2019/0122186 | A1 | 4/2019 | Kano et al. |
| 2019/0149325 | A1 | 5/2019 | Garagiola et al. |
| 2019/0158270 | A1 | 5/2019 | Berti |
| 2019/0213333 | A1* | 7/2019 | Williams ................ G06F 21/64 |
| 2019/0236559 | A1 | 8/2019 | Padmanabhan |
| 2019/0236562 | A1 | 8/2019 | Padmanabhan |
| 2019/0236598 | A1 | 8/2019 | Padmanabhan |
| 2019/0236606 | A1 | 8/2019 | Padmanabhan et al. |
| 2019/0238316 | A1 | 8/2019 | Padmanabhan |
| 2019/0238525 | A1 | 8/2019 | Padmanabhan et al. |
| 2019/0303121 | A1 | 10/2019 | Padmanabhan |
| 2019/0303445 | A1 | 10/2019 | Padmanabhan |
| 2019/0354967 | A1* | 11/2019 | Lee .................... G06F 16/1834 |
| 2019/0377806 | A1 | 12/2019 | Padmanabhan et al. |
| 2020/0042939 | A1 | 2/2020 | Padmanabhan |
| 2020/0089663 | A1 | 3/2020 | Padmanabhan |
| 2020/0089670 | A1 | 3/2020 | Padmanabhan et al. |
| 2020/0089671 | A1 | 3/2020 | Padmanabhan et al. |
| 2020/0089672 | A1 | 3/2020 | Velisetti et al. |
| 2020/0133955 | A1 | 4/2020 | Padmanabhan et al. |
| 2020/0134656 | A1 | 4/2020 | Padmanabhan |
| 2020/0169546 | A1 | 5/2020 | Padmanabhan |
| 2020/0186338 | A1 | 6/2020 | Davis et al. |
| 2020/0250174 | A1 | 8/2020 | Padmanabhan et al. |
| 2020/0250176 | A1* | 8/2020 | Padmanabhan ........... G06F 8/61 |
| 2020/0250177 | A1* | 8/2020 | Padmanabhan ....... G06F 16/214 |
| 2020/0250295 | A1 | 8/2020 | Padmanabhan |
| 2020/0250661 | A1 | 8/2020 | Padmanabhan et al. |
| 2020/0250683 | A1 | 8/2020 | Padmanabhan et al. |
| 2020/0250747 | A1 | 8/2020 | Padmanabhan |
| 2020/0252205 | A1 | 8/2020 | Padmanabhan |
| 2020/0252404 | A1 | 8/2020 | Padmanabhan |
| 2020/0252406 | A1 | 8/2020 | Padmanabhan et al. |
| 2020/0287718 | A1 | 9/2020 | Hildebrand et al. |
| 2020/0287719 | A1 | 9/2020 | Hildebrand et al. |
| 2020/0344132 | A1 | 10/2020 | Padmanabhan |
| 2020/0349142 | A1 | 11/2020 | Padmanabhan |
| 2020/0349564 | A1 | 11/2020 | Padmanabhan et al. |
| 2020/0374105 | A1 | 11/2020 | Padmanabhan |

FOREIGN PATENT DOCUMENTS

| | | |
|---|---|---|
| WO | 2018/007828 A2 | 1/2018 |
| WO | 2019/152750 A1 | 8/2019 |
| WO | 2019/241071 A1 | 12/2019 |

OTHER PUBLICATIONS

Final Office Action, U.S. Appl. No. 15/932,099, dated Jun. 1, 2020, 26 pages.
Genestier et al., "Blockchain for Consent Management in the eHealth Environment: A Nugget for Privacy and Security Challenges",J. Int. Soc. Telemed eHealth, Jan. 1, 2017, pp. 1-4.
International Search Report and Written Opinion, PCT App. No. PCT/US2019/016199, dated Apr. 2, 2019, 11 pages.
International Search Report and Written Opinion, PCT App. No. PCT/US2019/036103, dated Aug. 1, 2019, 10 pages.
McConaghy et al., "BigchainDB: A Scalable Blockchain Database", Whitepaper, Jun. 8, 2016, pp. 1-65.
Non-Final Office Action, U.S. Appl. No. 15/885,803, dated Jan. 8, 2020, 47 pages.
Non-Final Office Action, U.S. Appl. No. 15/885,811, dated Jan. 17, 2020, 40 pages.
Non-Final Office Action, U.S. Appl. No. 15/932,092, dated Jan. 22, 2020, 36 pages.
Non-Final Office Action, U.S. Appl. No. 15/932,100, dated Nov. 8, 2019, 9 pages.
Non-Final Office Action, U.S. Appl. No. 15/940,665, dated Mar. 23, 2020, 28 pages.
Notice of Allowance, U.S. Appl. No. 15/932,100, dated Feb. 20, 2020, 5 pages.
Ojha, "Chaincode for Go Developers, Part 1: Writing Blockchain Chaincode in Go for Hyperledger Fabric v0.6," IBM DeveloperWorks, 2017, pp. 1-15.
Peterson et al., "A Blockchain-Based Approach to Health Information Exchange Networks", Aug. 8, 2016, pp. 1-10.
Salesforce, "Force.com Apex Code Developer's Guide," version 34.0, 2015, 1000 pages.
Sandgaard et al., "MedChain White Paper v1.1", MedChain, Inc., 2018, pp. 1-53.
Wikipedia, "Solidity", Available online at <https://web.archive.org/web/20170202023041/https://en.wikipedia.org/wiki/Solidity>, Feb. 2, 2017, 2 pages.
Zyskind et al., "Decentralizing Privacy: Using Blockchain to Protect Personal Data", IEEE CS Security and Privacy Workshops, 2015, pp. 180-184.
"Using Sawtooth with Docker," Hyperledger Sawtooth v1.0.5, Application Developer's Guide, downloaded from https://sawtooth.hyperledger.org/docs/core/releases/1.0/app_developers_guide/docker.html on Jan. 29, 2020, pp. 1-15.
BigchainDB, "BigchainDB 2.0: The Blockchain Database," whitepaper version 1.0, May 2018, pp. 1-14.
International Search Report and Written Opinion, PCT App. No. PCT/US2019/023153, dated Jun. 11, 2019, 11 pages.

(56) References Cited

OTHER PUBLICATIONS

Non-Final Office Action, U.S. Appl. No. 15/932,099, dated Oct. 3, 2019, 26 pages.
Non-Final Office Action, U.S. Appl. No. 15/940,646, dated Apr. 29, 2019, 7 pages.
Notice of Allowance, U.S. Appl. No. 15/940,646, dated Oct. 31, 2019, 8 pages.
Wikipedia, "Federated database system," Nov. 1, 2017, retrieved from https://en.wikipedia.org/w/index.php?title=Federated_database_system&oldid=808166410, pp. 1-4.
Notice of Allowance, U.S. Appl. No. 15/940,665, dated Sep. 29, 2020, 17 pages.
Deloitte, "IoT Powered by Blockchain: How Blockchains Facilitate the application of Digital Twins in IoT", Blockchain Institute, May 2018, 20 pages.
NASDAQ, "Using Blockchain Track Assets Proof Ownership", 2020, 8 pages.
O'Neill, Jacqueline, "How Smart Certificates of Authenticity Improve Art Asset Management", Blockchain Art Collective, Jan. 17, 2019, 4 pages.
The LuxTag Project, "How Creating Digital Twins on Blockchain Will Protect Brands?", Available Online at <https://web.archive.org/web/20191130092747/https://medium.com/luxtag-live-tokenized-assets-on-blockchain/how-creating-digital-twins-on-blockchain-will-protect-brands-3ada31b5fb2f>, Nov. 15, 2018, 4 pages.
Corrected Notice of Allowability, U.S. Appl. No. 15/940,665, dated Nov. 19, 2020, 03 pages.
Final Office Action, U.S. Appl. No. 15/885,803, dated Jul. 20, 2020, 29 pages.
Final Office Action, U.S. Appl. No. 15/885,811, dated Aug. 5, 2020, 45 pages.
Non-Final Office Action, U.S. Appl. No. 15/932,092, dated Jun. 22, 2020, 42 pages.
International Search Report and Written Opinion, App. No. PCT/US2020/015618 dated May 11, 2020, 11 pages.
Non-Final Office Action, U.S. Appl. No. 15/932,099, dated Mar. 17, 2021, 33 pages.
Non-Final Office Action, U.S. Appl. No. 16/177,305, dated Jul. 23, 2020, 40 pages.
Non-Final Office Action, U.S. Appl. No. 16/264,657, dated Sep. 18, 2020, 33 pages.
Non-Final Office Action, U.S. Appl. No. 16/683,945, dated Sep. 14, 2020, 18 pages.
Notice of Allowance, U.S. Appl. No. 16/264,653 dated Nov. 23, 2020, 15 pages.

\* cited by examiner

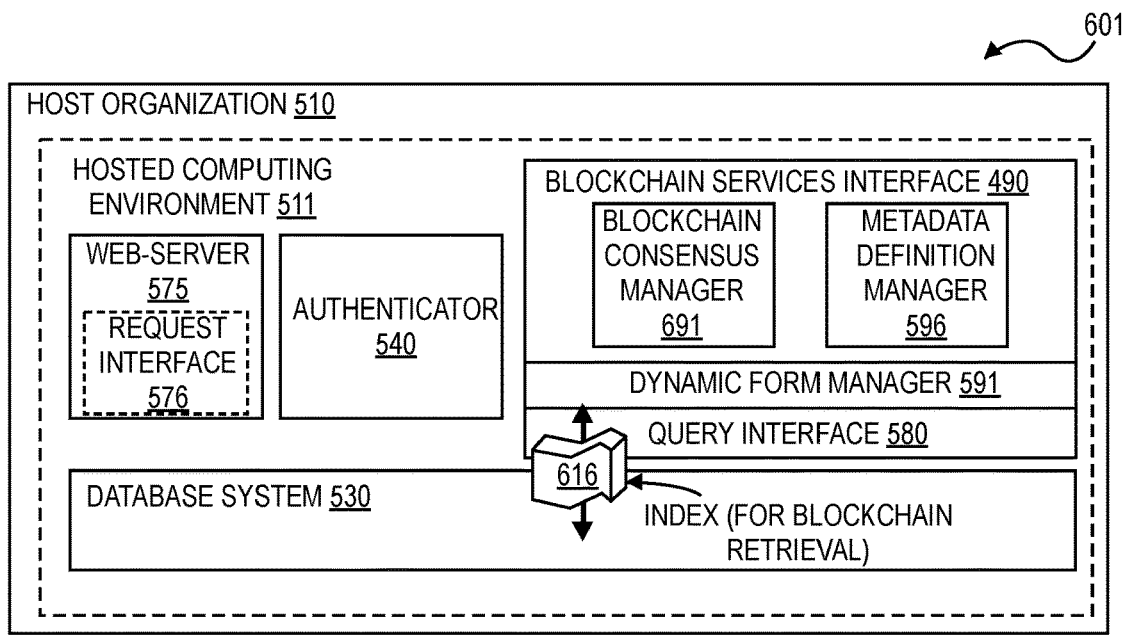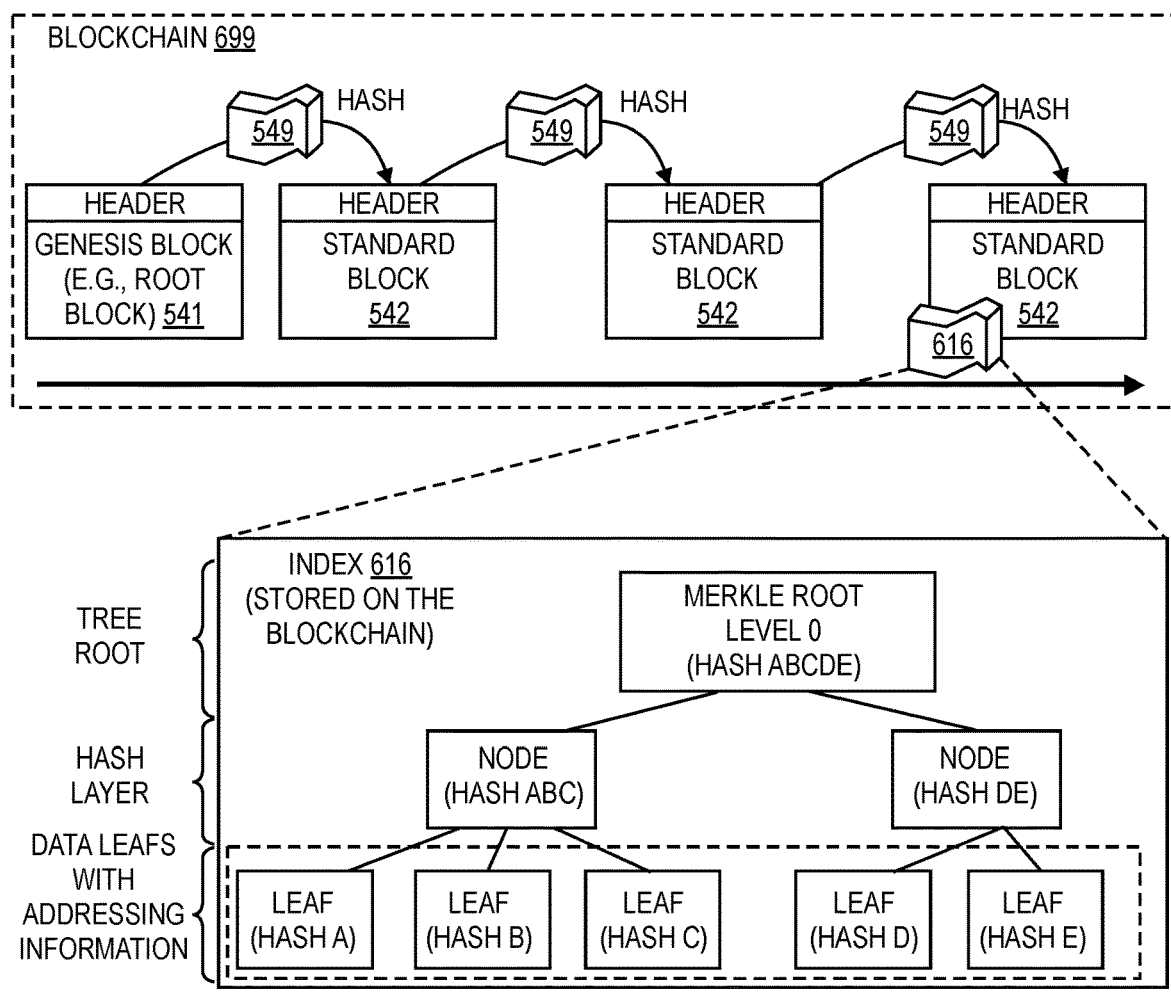
FIG. 6

SYSTEM OR METHOD TO DISPLAY BLOCKCHAIN INFORMATION WITH CENTRALIZED INFORMATION IN A TENANT INTERFACE ON A MULTI-TENANT PLATFORM

TECHNICAL FIELD

One or more implementations relate to the field of integrating centralized and decentralized information in user defined interfaces; and more specifically, to the process of displaying blockchain information with centralized information in a tenant interface on a multi-tenant platform.

BACKGROUND ART

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network). Blockchains can be utilized to store many different types of data including financial data. Such financial data can be stored in a blockchain that functions as a distributed ledger.

A distributed ledger in blockchain is shared by all of the participants in that blockchain. Distributed Ledger Technology (DLT) helps to address and overcome many of the types of shortcomings of conventional financial systems, however, the technology may nevertheless be expanded to introduce even further benefits to those utilizing such DLT and related blockchain platforms.

Blockchain technology can be utilized as a data management system, in place of traditional data management systems that are centralized. Centralized data management system stored data in a database that is managed by a single entity although the data management system can be implemented in a cloud or otherwise physically distributed it has a unified and single purpose data management interface to store, retrieve, and organize the data. A data management system utilizing blockchain stores data in distributed or decentralized manner using the functions and principles of the block chain that are not controlled by a single entity. Storing some sets of data in a centralized data management system and other sets of data in decentralized data management systems is increasingly common. However, managing the data when it is stored in different management systems becomes a problematic and resource intensive task as each data management system has its own processes for how data may be accessed and modified.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 6 is a diagram of another example architecture according to some example implementations.

DETAILED DESCRIPTION

The following description describes methods and apparatus for displaying and interacting with data stored in a decentralized data management system (e.g., data stored in a blockchain) and data stored in a centralized data management system (e.g., data stored in a traditional data base management system). Displaying data in a single interface (e.g., a single screen) that is accessed from decentralized and centralized data management system is a significant problem for applications, such as applications operating in multi-tenant cloud based systems (e.g., customer relationship management (CRM) systems).

Building a custom interface for displaying centralized and decentralized data is inefficient and resource intensive. Further, changes to how the data is stored in either the decentralized data management system or the centralized data management system can cause problems for the customized interface. The implementations described herein provide a system and method that provides a dynamic user interface (UI) form, referred to herein as a dynamic form, to define interfaces to show both types of data. The dynamic forms can be defined by a user, tenant, or similar entity for use by applications of a given tenant, e.g., in a multi-tenant system.

There are generally three types of information that need to be displayed in an application interface that are stored in either a centralized or decentralized data management system. The three types of information include (1) a list of information from a decentralized data management system that is associated with a particular record of a centralized data management system (e.g., 1 CRM record associated with N blockchain records); (2) merged information associated with a given centralized data management system record (e.g., 1 CRM record associated with 1 blockchain record); and (3) a list of data from a centralized data management system associated with a given decentralized data management system record (e.g., 1 blockchain record associated with N CRM records). The implementations utilize a meta-data driven blockchain architecture and a virtual chain architecture. The implementations also enable drag and drop functionality in the user interface based on the dynamic forms. The drag and drop functionality is possible due to metadata being available as entity objects within the centralized database management system.

Figure 1A:
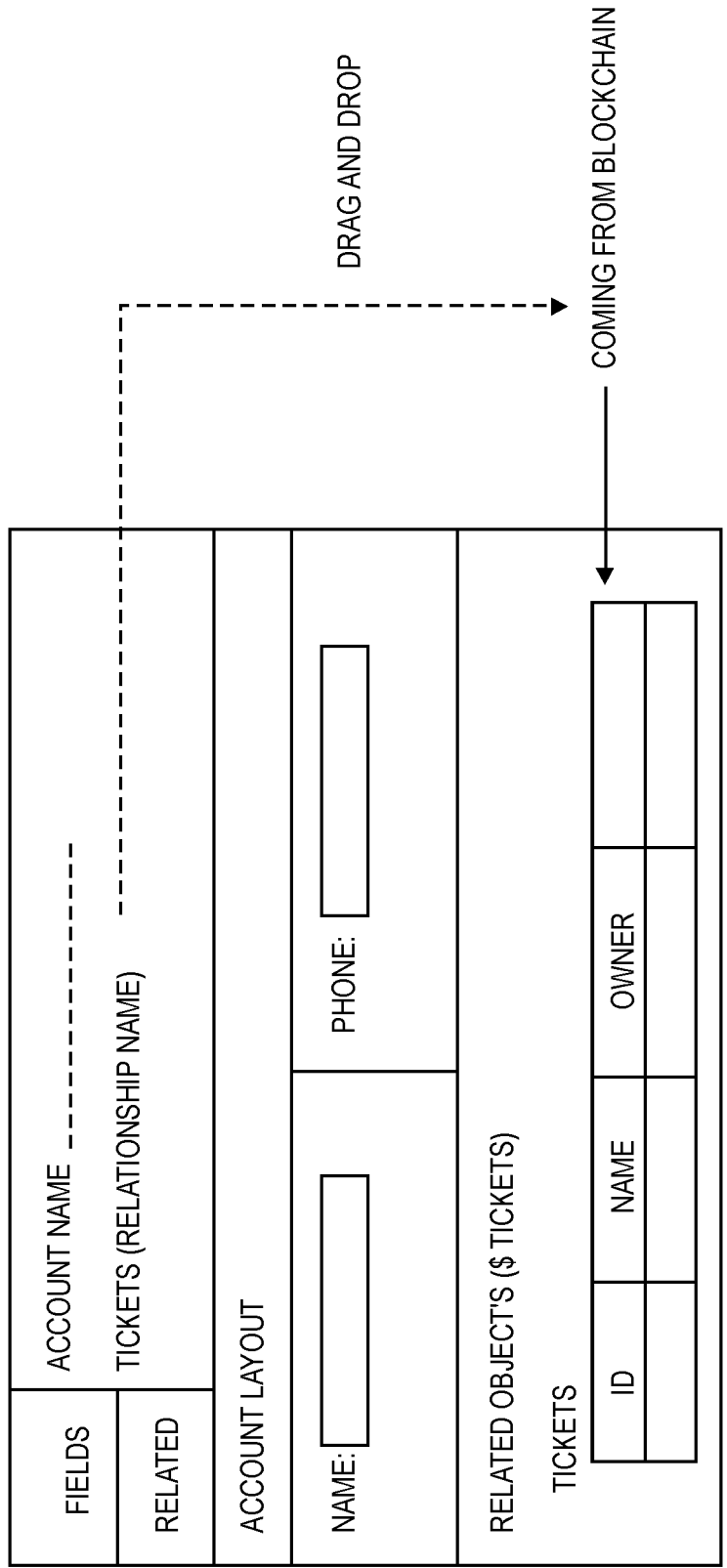
FIG. 1A is a block diagram illustrating an example interface displaying data from centralized and decentralized data management systems in a first case according to some example implementations.

FIG. 1A is a block diagram illustrating an example interface displaying data from centralized and decentralized data management systems in a first case according to some example implementations. The illustrated interface is defined as an extensible markup language (XML) or similar file. In the example interface an account with information stored in a centralized data management system is associated with a set of 'tickets' stored in a decentralized data management system (e.g., a single CRM record associated with a set of N blockchain records). The relationship between the single centralized data management system record and the set of decentralized data management records can be based on the use of a common identifier (ID) that is stored in the decentralized data management system records to represent the relationship with the centralized data management system record. An external identifier (external ID) can be stored in the centralized data management record to represent that relationship. For example, an account record in a CRM system can have a customer user unique identifier (UUID) that is referenced in blockchain ticket records with a customer identifier field that is set to the customer UUID. This enables the retrieval of the associated decentralized data management system information when the centralized data management system record is accessed. Specifically, the blockchain records can be retrieved using a Merkle trie tree for indexing where a Merkle trie tree partial index can be composed of a customer ID (e.g., customer UUID) and a decentralized record identifier (e.g., in this example a ticket record identifier). Using the virtual chaining process (described further herein with relation to FIG. 7), a virtual object that represents the decentralized data management record (e.g., a blockchain object) as an account identifier and this account identifier is generated as a materialized view that contains data retrieved from the blockchain and cross-referenced with the account identifier in the centralized data management system (e.g., the CRM system).

Thus, as can be seen in FIG. 1A, a user interface can be generated with account information retrieved from a centralized data management system record (e.g., an account record) selected by a user including in this example account name, user name, phone, and similar data, which is displayed along with related objects retrieved from a decentralized data management system. In this example a list of tickets including a ticket identifier, name, owner and similar information are displayed for each ticket.

Where a single decentralized data management record is associated with a set of centralized data management system records the process is similarly implemented in the reverse. An identifier from the decentralized data management system is associated with a record identifier for a set of centralized data management system records, where this relationship enables the centralized data management system records to be accessed and relevant data displayed upon a user selection of a decentralized data management system record for display.

Figure 1B:
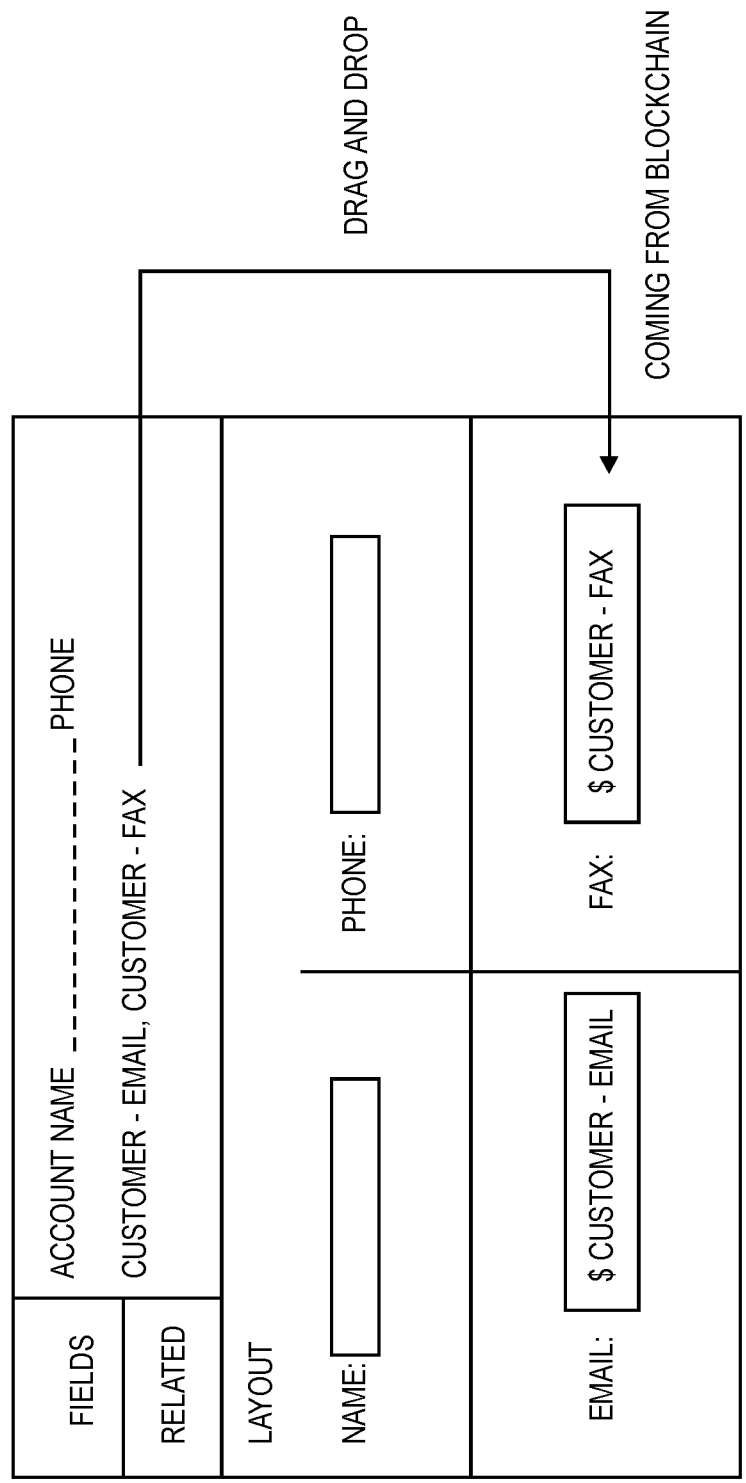
FIG. 1B is a block diagram illustrating an example interface displaying data from centralized and decentralized data management systems in a second case according to some example implementations.

FIG. 1B is a block diagram illustrating an example interface displaying data from centralized and decentralized data management systems in a second case according to some example implementations. In this example, the interface is designed to display a centralized data management record in conjunction with a decentralized data management record. For example a single CRM record and a single associated blockchain record. This implementation also utilizes the dynamic form to enable all of the data to be seamlessly represent on screen at the same time. For example, account information from a CRM recorded is displayed with the customer information from a blockchain record. In this example, an account record in a CRM record has a customer UUID field represented as an external ID. The account id is not part of the blockchain record. A virtual object represents the blockchain object for the user interface does include the account id. The virtual object is generated as a materialized view of the blockchain record that contains data pulled from the blockchain and cross referenced with the account id. The dynamic form that defines the interface can reference the data with a relationship name, where the relationship name is a combination of the identifiers from the blockchain and the CRM (e.g., blockchain_customer). In the example illustrated, data for a field could be referenced as ${CurrentRecord}.${RelationshipName}.${Address} where the current record uses the current record id and the relationship name is blockchain_customer. The address will address the unique relationship in the blockchain. This can be a recursive process to multiple sub-levels of blockchain records, based on the use of the Merkle trie tree indexing or similar addressing schemes.

As with the prior example, user interface features such as drag and drop are supported to moved data from the centralized data management record fields to the decentralized data management record fields and vice versa.

Figure 2:
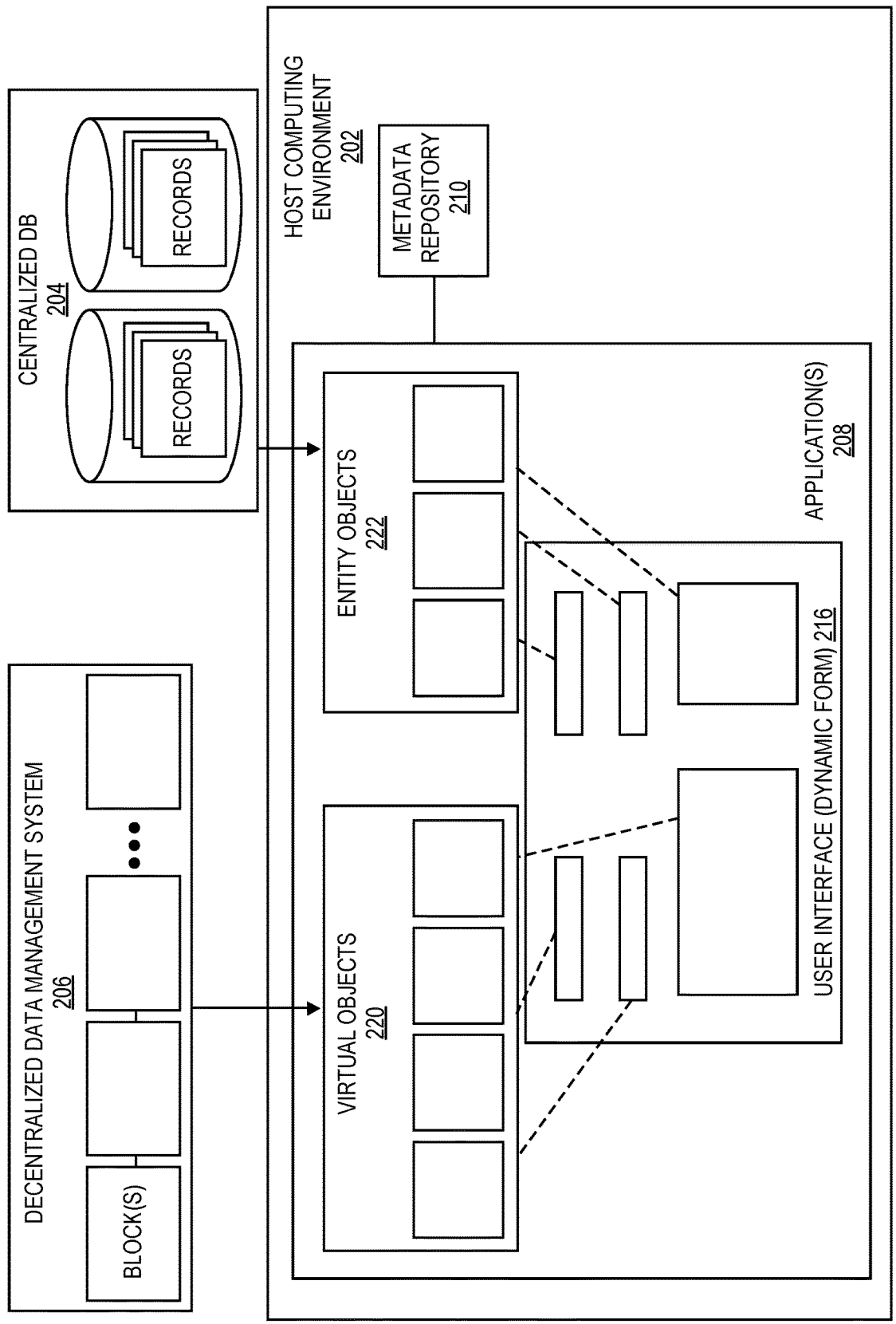
FIG. 2 is a block diagram illustrating an application operating in a multi-tenant system with an interface that displays both data from both centralized and decentralized data management systems according to some example implementations.

FIG. 2 is a block diagram illustrating an application operating in a multi-tenant system with an interface that displays both data from both centralized and decentralized data management systems according to some example implementations.

Data may be stored and accessed from various data management systems, including both a centralized data management system (CD) 204 and a decentralized data management system (DDM) 206. CD 204 may include a system of one or computing devices or servers that manage data in a row wise or column wise database format. CD 204 may include a master repository of data which may be accessed or changed by various computing devices which have access to CD 204. For example, an enterprise server may host a master set of data that is accessed and modified by a number of computing devices. Then, for example, the computing devices may either synchronously or asynchronously perform updates to the master data set.

The CD 204 can include a conflict resolution mechanism that resolves any conflicts that may occur when two or more devices try and modify the same data during the same time interval. CD 204 can include a multi-versioning database that hosts multiple versions of data based on various transactions which can access various records of the CD 204.

The DDM 206 can be a system of multiple computing devices arranged in a peer-to-peer network that together maintain a blockchain or distributed ledger of transactions between the users, systems, or devices that are part of the DDM 206 network. In a blockchain, a ledger of transactions may be maintained in a growing list of records, referred to as blocks. Each block can include a hash pointer to a previous block, a timestamp, and transactional data. This growing list of blocks and pointers can be the chain of blocks referred to as the blockchain. As used herein, the terms blockchain and DDM 206 may be used interchangeably.

Once data of a transaction is recorded on DDM 206, the data cannot be altered afterwards without altering all of the subsequent blocks, without a collusion of a majority of the network, which helps to prevent fraud. The DDM 206 can be used to store various types of data including, but not limited to, event data, transaction data occurring between parties (particularly that are members of the blockchain), and any types of user records. The data of the DDM 206 can be distributed multiple times across the networks of machines or systems participating in the DDM 206. Information stored across the participating nodes can continually or periodically be reconciled or otherwise asynchronously updated. Unlike the CD 204, the data of the DDM 206 is not stored in any single location, but instead is decentralized, distributed, or shared amongst the member devices of the chain or information network.

In some implementations, a host computing environment 202 can assist in managing data stored across both the CD 204 and the DDM 206 as a set of objects. The objects can include a grouping or collection of fields, rows, or columns that are related to a particular concept or idea. Example objects can include customers, employees, accounts, branches, partners, vehicles, products, and suppliers. One or more applications 208 or programs (for example, operating on a multi-tenant platform) can access or organize data as various objects which are managed by host computing environment 202 or related components in the manner described herein.

Each object can include various (one or more) fields of data or information relevant to that particular object. Example objects for customer records can include fields such as Name, SSN (social security number), address, and account balance. The objects can include any number of variety of fields, other than those shown, such as phone number, how long they have been a customer, family information, medical information, nationality, residency, order history, payment history, and similar information.

In some implementations, the objects representing data retrieved from a DDM 206 can be virtual objects 220, while data retrieved from the CD 204 can be entity objects 222. These objects can be referenced to access or modify data from the respective sources without the applications 208 having to directly access those sources. Thus, the objects are part of an interface to translate queries and data modifications from the applications 208 into data retrieval and modifications with the respective data management systems.

In some implementations, the host computing environment 202 can maintain a metadata repository 210 or other mapping that is used to store information about the fields of the various objects being used or accessed across one or more applications Example information that may mapped or tracked by metadata repository 210 include the field, the field type, a key type, and a location of the field. The information of metadata repository 210 can be used to separate or categorize the fields of the various objects based on where (i.e., location) or how the underlying data is stored or managed. For example, metadata repository 210 can track or indicate whether the fields are CD derived fields managed by CD 204 or DDM derived fields managed by the DDM 206. In another implementation, in which multiple CDs 204 or DDM 206 store or manage data, the user interface 216 may display fields from across the CDs 204 and DDMs 206 and metadata repository 210 can map the fields to the particular CD 204 or by which particular DDM 206 is being managed. The mapping may include identifier, table, row, column, memory block, or other location information.

Rather than executing a first application to access or modify data from the CD 204 and a second application to access or modify data from the DDM 206, user interface 216 can include, display, or enable information from the various CDs 204 and/or DDMs 206 to be modified from one unified interface or display screen. User interface 216 can be provided by an application, app, program or other system that a user accesses to submit a data request to access or modify the data regardless of whether the data is stored on either a CD 204 or DDM 206.

In some implementations, the host computing environment 202 can provide or make available application 208 and user interface 216 to a user device. The user interface 216 can then be used to access or modify the data across one or more applications for which the host computing environment 202 is providing the data access and management functionality described herein. The host computing environment 202 can abstract the data access and modification processes of the CD 204 and the DDM 206 from the user or system which may be making a request, thus simplifying data management tasks.

In one implementation, as part of this abstraction process, an application programming interface (API) may enable user interface 216 to communicate data requests from a user or other system to the host computing environment 202. An application developer may reference this API to configure an application-specific user interface 216 for example by defining a dynamic form from which a user or system may access data stored on both or either of the CD 204 and the DDM 206. From the user interface 216, a user or system may submit one or more data requests.

The user interface 216 or the underlying application may not distinguish between fields that are being managed by CD 204 or DDM 206. From the user interface 216 point-of-view, data is the same regardless of whether is managed in a centralized or decentralized fashion. In an embodiment, host computing environment 202 can receive, from user interface 216, an update, add, delete, or read request in the same manner regardless of whether the underlying data (field) is being managed on CD 204 or DDM 206. The management details may be abstracted from the user interface 216 and/or an underlying application which may communicate requests via an application programming interface (API).

Upon receiving the request, host computing environment 202 may identify whether the data associated with the request corresponds to CD fields and/or DDM fields. Based on this determination, host computing environment 202 may determine how to interpret, translate or execute the request. For example, data requests may be received as SQL queries or requests. However, while CD 204 may be able to execute SQL queries, DDM 206 may not be able to execute or process SQL queries. Upon receiving a data request, if host computing environment 202 determines that the data of the request corresponds to a CD field, the SQL query may be directly executed against CD 204 without any additional processing.

However, if host computing environment 202 determines that the data of the request corresponds to a DDM field, then host computing environment 202 can translate or covert the request so that it is executable against DDM 206. Receiving a data request that is executable against at least one of DDM 206 or CD 204 can enable host computing environment 202 to save processing resources and speed up execution when it is determined that the data request does not have to be converted or translated (e.g., for execution against CD 204). In another embodiment, if most data requests 114 are against DDM 206, then data requests can be received as default executable against DDM 206 and may be converted when CD fields are identified.

The host computing environment 202 can enable a user or other interfacing system to query CD fields and DDM fields using a single query or single query format. For example, host computing environment 202 may receive data request which may include both a name and balance lookup or modification. The host computing environment 202 may then translate the data request into one or more SQL or other query languages that may be necessary to retrieve, query, or modify the data of the CD fields.

The host computing environment 202 may also translate the data request into one or more instructions (e.g., application programming interface (API) calls) that may be necessary to retrieve, query, or modify the data of the DDM fields. In an embodiment, accessing CD 204 or DDM 206 may require username, passwords, private key, public key, and/or other authentication or user information. In such embodiments, host computing environment 202 may retrieve or request the required information as part of the translation process.

In some implementations, if data has been retrieved from CD 204 or DDM 206, host computing environment 202 may further translate or otherwise reformat the data so that it may be displayed or otherwise understood by a requesting user or system. By providing underlying translation processes, host computing environment 202 may enable different applications to provide a visual display or query format that is unified across different applications or otherwise independent of the underlying data management systems being accessed (e.g., CD 204 and DDM 206).

In some implementations, each transaction submitted or reconciled into the ledger of DDM 206 may be assigned or associated with an asset identifier (ID). For example, if balance is increased due to a funds transfer, then asset ID can reference a transaction in DDM 206 or other entry in which the new balance is provided. Or, for example, asset ID can indicate a storage location (within a ledger of DDM 206) of the value of the balance information for a particular customer record or account.

In some implementations, if a transaction or request is rejected, not reconciled, or otherwise not included on the ledger of DDM 206, host computing environment 202 may signal this result to a user via the user interface 216. The value of the requested data field (e.g., balance) would not be updated. DDM 206 may reject a transaction for any number of reasons, including for example, the private key may have been incorrect. However, even upon a rejected transaction, asset II) can still refer to the proper balance information as maintained by DDM 206.

In some implementations, host computing environment 202 may store the asset ID as part of object which may be stored on CD 204. Rather than storing the actual account balance information (which may be maintained by DDM 206), CD 204 may include asset ID may reference the most recent balance information from DDM 206. Then, for example, when the actual balance information is requested, host computing environment 202 may use asset ID to look-up the balance data from DDM 206 and return that information to CD 204 or user interface 216. Storing asset ID can enable host computing environment 202 to perform faster lookups for values of the corresponding DD data field (e.g., balance) than if the asset ID was not maintained or stored.

Figure 3A:
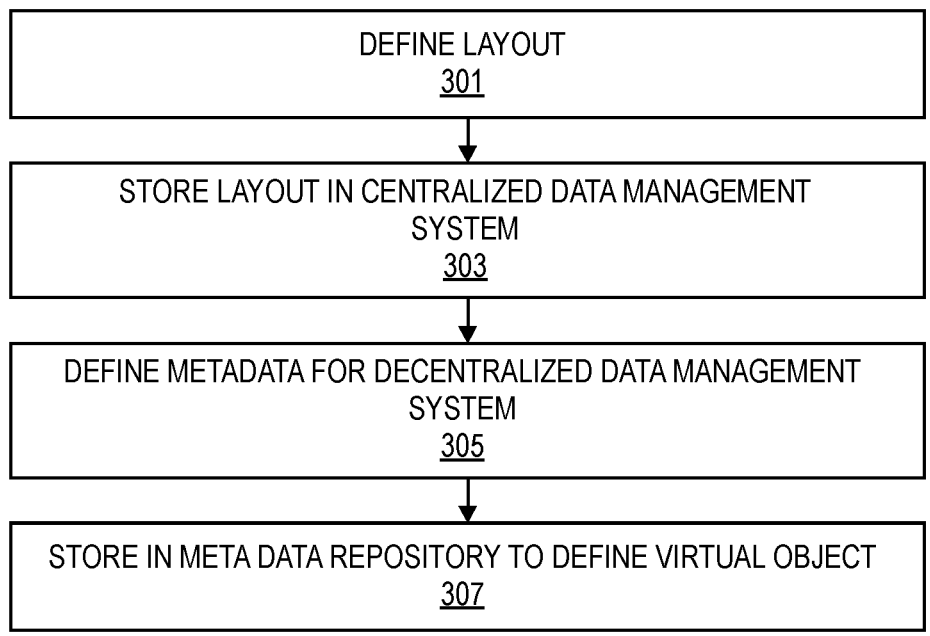
FIG. 3A is a flow diagram illustrating a process to configure a user interface according to some example implementations.

FIG. 3A is a flow diagram illustrating a process to configure a user interface and metadata according to some example implementations. A user interface can be defined by a developer or administrator using an XML format and an addressing scheme for fields of the data to be retrieved from either a centralized or decentralized data management system. The administrator or designer can define a layout for the dynamic form/user interface using XML or similar language. An example dynamic form:

<Layout>
<fields>$customer.email </fields>
<lists>
<list><relationship>$tickets </relationship>
  <field>name </field>
  <field>owner <field>
</list>
</layout>

The example defines an interface with an email of a customer and a list of tickets indicating a name and owner of each ticket. The dynamic form is agnostic as to the source of the data fields and the addressing is also agnostic to be interpreted and used in conjunction with the defined metadata using virtual chaining to retrieve the necessary data. The addressing scheme can support recursive definitions.

After a layout is defined (Block 301), then the layout file is stored with a centralized data management system (Block 303). Separately, metadata for the associated decentralized data management system is defined (Block 305) and stored in a metadata repository to define virtual objects to represent retrieved data from the decentralized data management system (Block 307).

Figure 3B:
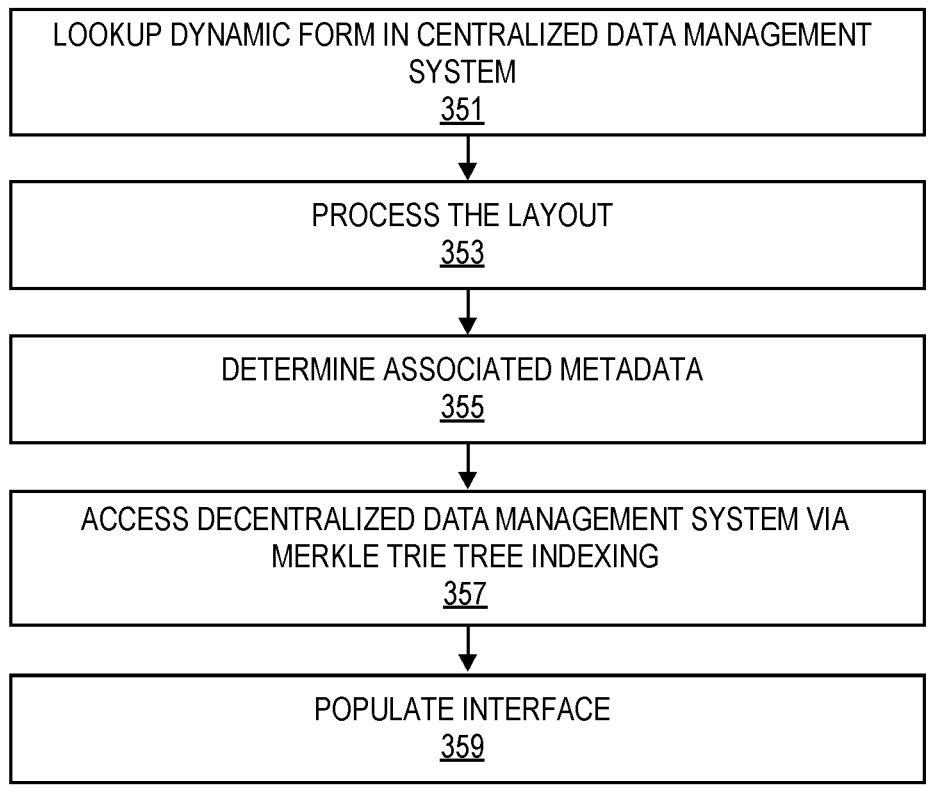
FIG. 3B is a flow diagram illustrating a process to configure metadata associated with a user interface according to some example implementations.

FIG. 3B is a flow diagram illustrating a process for populating data into a user interface according to some example implementations. The process for generating the user interface based on the dynamic form is triggered by a user selecting a user interface and/or record to be viewed via an application that looks up or similarly retrieves the dynamic form (Block 351). The dynamic form can be retrieved from the centralized data management system or similar location accessible to the application. The layout is processed to start the rendering and retrieval of the data (Block 353). The associated metadata is determined for any decentralized data management system data (Block 355). The layout is continued to be processed to retrieve the data as addressed in the dynamic for using indexing into the data management systems such as an index based on a Merkle trie tree (Block 357). The accessed data is then populated to render the user interface (Block 359).

Figure 4:
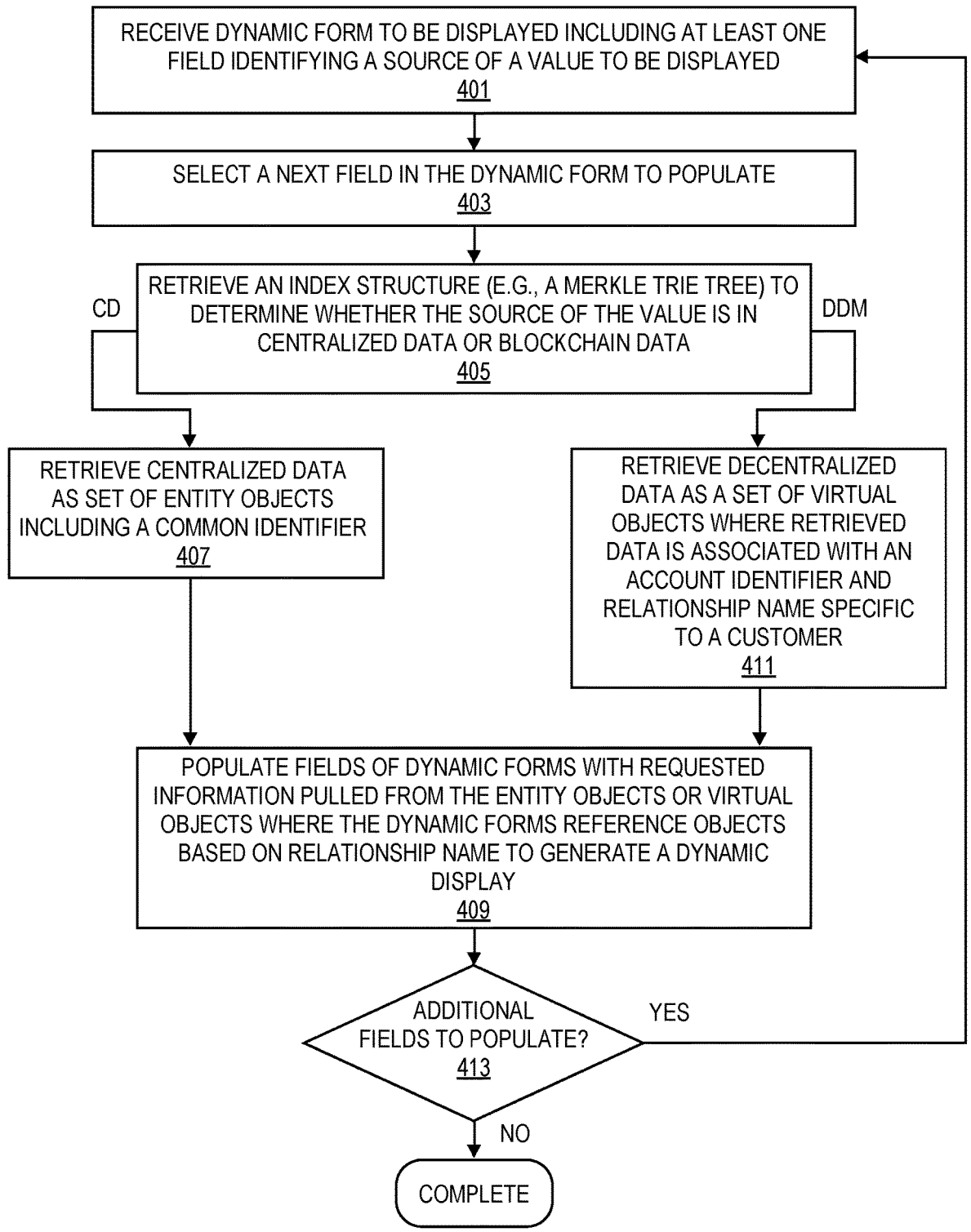
FIG. 4 is a flow diagram illustrating a process for populating data into a user interface according to some example implementations.

FIG. 4 is a flow diagram illustrating a process for populating data into a user interface according to some example implementations. In some implementations, the processing of the dynamic form to access each of the identified data fields is shown in greater detail with reference to FIG. 4. The process can be triggered responsive to retrieval of a dynamic form to be rendered as a user interface for an application (Block 401). The dynamic form can be populated and rendered as a function called by an application. The function can be a dynamic form manager or similar function. The dynamic form manager can sequentially process the dynamic form to identify each data field to be accessed and to populate that data field in the user interface to be generated. The process can select a next field in the dynamic form to access and populate into the user interface (Block 403). The selected field will include an address that is utilized to apply to an index structure (e.g., a Merkle trie tree) to determine whether the source of the value is in a centralized data management system or a decentralized data management system (Block 405).

If the data is in a centralized data management system (CD), then the data is retrieved using an SQL or similar query to the centralized data management system determined based on the address (Block 407). The centralized data management system returns the requested data as a set of entity object or the returned data is utilized to populate the entity objects, which in turn are accessed to retrieve the requested data and to populate the layout of the user interface (e.g., a dynamic display of data from both centralized and decentralized data management systems) (Block 409). The process then continues to check whether additional fields remain to be processed (Block 413). If no additional fields remain to be processed in the dynamic form, then the process completes and the user interface can be rendered. If additional fields remain to be processed, then the next field is selected (Block 403).

In the case where the selected field is from a decentralized data management system, then the data is retrieved from the decentralized data management system as a set of virtual objects (Block 411). An account identifier or similar identifier and relationship name is utilized to index and identify the blocks with relevant information from the decentralized data management system. The decentralized data management system returns the requested data as a set of virtual objects or the returned data is utilized to populate the virtual objects, which in turn are accessed to retrieve the requested data and to populate the layout of the user interface (e.g., a dynamic display of data from both centralized and decentralized data management systems) (Block 409). The virtual objects can also be populated with other data as specified in the associated metadata.

Figure 5:
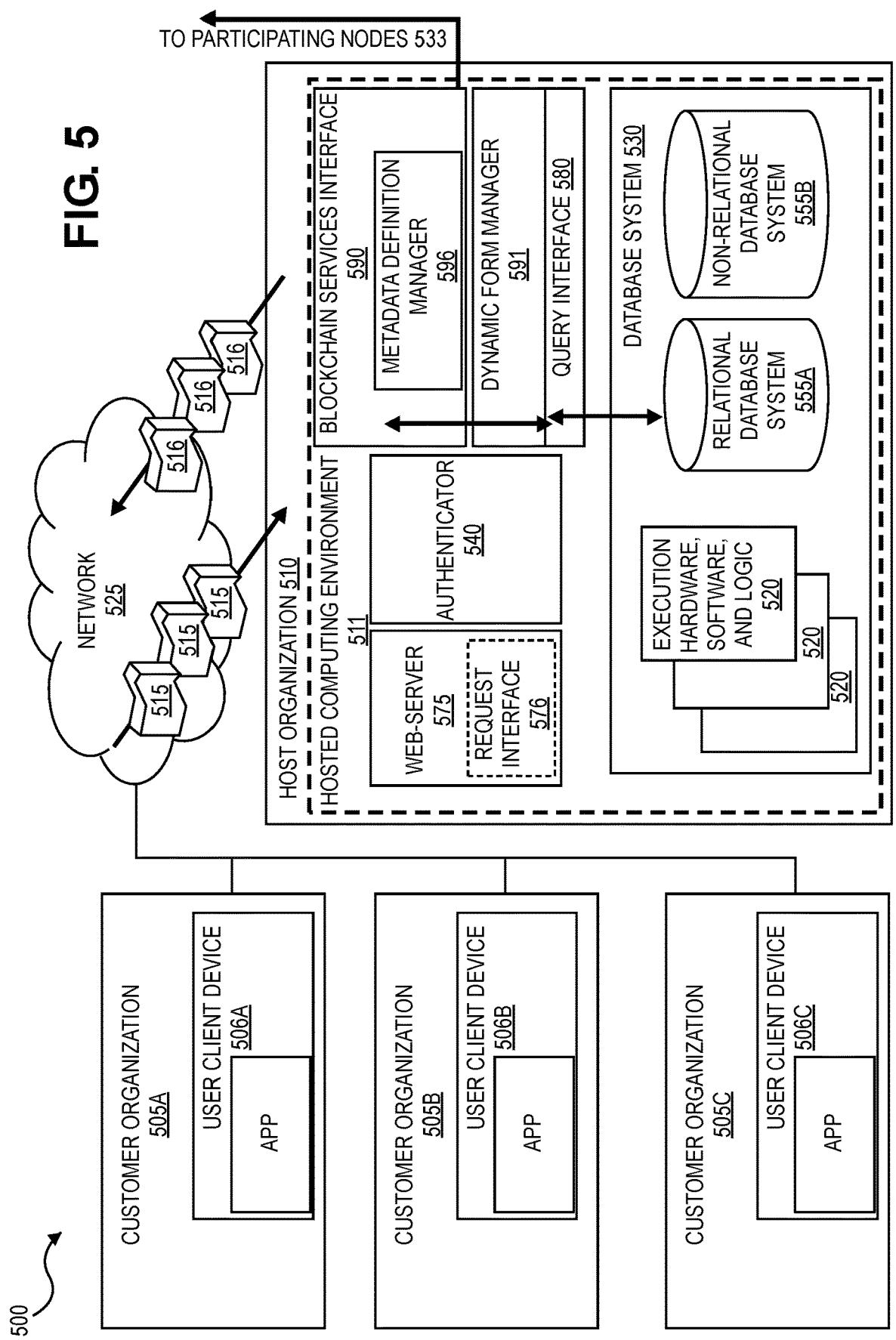
FIG. 5 is a diagram of an example architecture according to some example implementations.

FIG. 5 is a diagram of an example architecture according to some example implementations. In one example implementation, a hosted computing environment 511 is communicably interfaced with a plurality of user client devices 506A-C (e.g., such as mobile devices, smart phones, tablets, PCs, etc.) through host organization 510. A database system 530 includes databases 555A and 555B, for example, to store application code, object data, tables, datasets, and underlying database records including user data on behalf of customer organizations 505A-C (e.g., users of such a database system 530 or tenants of a multi-tenant database type database system or the affiliated users of such a database system). Such databases include various database system types including, for example, a relational database system 555A and a non-relational database system 555B according to certain embodiments.

In certain embodiments, a client-server computing architecture may be utilized to supplement features, functionality, or computing resources for the database system 530 or alternatively, a computing grid, or a pool of work servers, or some combination of hosted computing architectures may provide some or all of computational workload and processing demanded of the host organization 510 in conjunction with the database system 530.

The database system 530 depicted in the embodiment shown includes a plurality of underlying hardware, software, and logic elements 520 that implement database functionality and a code execution environment within the host organization 510.

In accordance with one embodiment, database system 530 utilizes the underlying database system implementations 555A and 555B to service database queries and other data interactions with the database system 530 that communicate with the database system 530 via the query interface 580. The hardware, software, and logic elements 520 of the database system 530 are separate and distinct from the customer organizations (505A, 505B, and 505C) which utilize web services and other service offerings as provided by the host organization 510 by communicably interfacing to the host organization 510 via network 525. In such a way, host organization 510 may implement on-demand services, on-demand database services or cloud computing services to subscribing customer organizations 505A-C.

In one implementation, each customer organization 505A-C is an entity selected from the group consisting of: a separate and distinct remote organization, an organizational group within the host organization 510, a business partner of the host organization 510, or a customer organization 505A-C that subscribes to cloud computing services provided by the host organization 510.

Further depicted is the host organization 510 receiving input and other requests 515 from customer organizations 505A-C via network 525 (e.g., a public network, the Internet, or similar network). For example, incoming search queries, database queries, API requests, interactions with displayed graphical user interfaces and displays at the user client devices 506A-C, or other inputs may be received from the customer organizations 505A-C to be processed against the database system 530, or such queries may be constructed from the inputs and other requests 515 for execution against the databases 555 or the query interface 580, pursuant to which results 516 are then returned to an originator or requestor, such as a user of one of a user client device 506A-C at a customer organization 505A-C.

In one implementation, requests 515 are received at, or submitted to, a web-server 575 within host organization 510. Host organization 510 may receive a variety of requests for processing by the host organization 510 and its database system 530. Incoming requests 515 received at web-server 575 may specify which services from the host organization 510 are to be provided, such as query requests, search request, status requests, database transactions, graphical user interface requests and interactions, processing requests to retrieve, update, or store data on behalf of one of the customer organizations 505A-C, code execution requests, and so forth. Web-server 575 may be responsible for receiving requests 515 from various customer organizations 505A-C via network 525 on behalf of the query interface 580 and for providing a web-based interface or other graphical displays to an end-user user client device 506A-C or machine originating such data requests 515.

Certain requests 515 received at the host organization may be directed toward a blockchain for which the blockchain services interface 590 of the host organization 510 operates as an intermediary.

The query interface 580 is capable of receiving and executing requested queries against the databases and storage components of the database system 530 and returning a result set, response, or other requested data in furtherance of the methodologies described. The query interface 580 additionally provides functionality to pass queries from web-server 575 into the database system 530 for execution against the databases 555 for processing search queries, or into the other available data stores of the host organization's computing environment 511. In one embodiment, the query interface 580 implements an Application Programming Interface (API) through which queries may be executed against the databases 555 or the other data stores. Additionally, the query interface 580 provides interoperability with the blockchain services interface 590, thus permitting the host organization 510 to conduct transactions with either the database system 530 via the query interface 580 or to transact blockchain transactions onto a connected blockchain for which the host organization 510 is a participating node or is in communication with the participating nodes 533, or the host organization 510 may conduct transactions involving both data persisted by the database system 530 (accessible via the query interface 580) and involving data persisted by a connected blockchain (e.g., accessible from a participating node 533 or from a connected blockchain directly, where the host organization operates a participating node on such a blockchain).

In certain embodiments, the Application Programming Interface (API) of the query interface 580 provides an API model through which programmers, developers, and administrators may interact with the blockchain services interface 590 or the centralized database system 530 (referred to herein as 'database system 530'), or both, as the needs and particular requirements of the API caller dictate.

The hosted computing environment 511 and/or host organization 510 can implement the functions described herein with relation to FIGS. 1A-4 as part of or in conjunction with a dynamic form manager 591. The dynamic form manager 591 can interface with decentralized data management systems such as the blockchain via blockchain services interface 590 or with centralized data managements systems 530 via a query interface 580. The dynamic form manager 591 can operate in conjunction with web server 575 and the request interface 576 to retrieve data for a user interface to be displayed via applications at the user client devices 506A-C.

Host organization 510 may implement a request interface 576 via web-server 575 or as a stand-alone interface to receive requests packets or other requests 515 from the user client devices 506A-C. Request interface 576 further supports the return of response packets or other replies and responses 1D16 in an outgoing direction from host organization 510 to the user client devices 506A-C. Authenticator 540 operates on behalf of the host organization to verify, authenticate, and otherwise credential users attempting to gain access to the host organization as well as resources and services hosted by the host organization 510 such as the verification system.

Further depicted within host organization 510 is the blockchain services interface 590 having included therein both a blockchain consensus manager 691 which facilitates consensus management for private and public blockchains upon which tenants, customer organizations, or the host organization itself 510 operate as a participating node on a supported blockchain.

As shown here, the blockchain services interface 590 communicatively interfaces the host organization 510 with other participating nodes 533 (e.g., via the network 525) so as to enable the host organization 510 to participate in available blockchain protocols by acting as a blockchain protocol compliant node, which in turn, permits the host organization 510 to access information within such a blockchain as well as enabling the host organization 510 to provide blockchain services to other participating nodes 533 for any number of blockchain protocols supported by, and offered to customers and subscribers by the host organization 510. In certain embodiments, the host organization 510 both provides the blockchain protocol upon which the host organization then also operates as participating node. In other embodiments, the host organization merely operates as a participating node so as to enable the host organization 510 to interact with the blockchain protocol(s) provided by others.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high *Byzantine* fault tolerance. Decentralized consensus has therefore been achieved with a blockchain. This makes blockchains suitable for the recording of events, medical records, insurance records, and other records management activities, such as identity management, transaction processing, documenting provenance, or voting.

A blockchain database is managed autonomously using a peer-to-peer network and a distributed timestamping server.

Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 510 provides a wide array of data processing and storage services, including the capability of providing vast amounts of data with a single responsible agent, such as the host organization 510, blockchain services differ insomuch that the host organization 510 is not a single authority for such services, but rather, via the blockchain services interface 590, is one of many nodes for an available blockchain protocol or operates as blockchain protocol manager and provider, while other participating nodes 533 communicating with the host organization 510 via blockchain services interface 590 collectively operate as the repository for the information stored within a blockchain by implementing compliant distributed ledger technology (DLT) in accordance with the available blockchain protocol offered by the host organization 510.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 533 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 533 are trusted more than any other, although this default may be altered via certain specialized blockchain protocols as will be described in greater detail below. Blockchain transactions are broadcast to the network using software, via which any participating node 533, including the host organization 510 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. The concept of permissioned verifiers is separate than the permissioned access control processes described herein. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 590 of the host organization 510, both private and public mechanisms are described herein and utilized as needed for different implementations supported by the host organization 510.

An advantage to an open, permissionless, or public, blockchain network is that guarding against bad actors is not required and no access control is generally needed, although as discussed herein, the embodiments provide for a blockchain access control for particular cases that are applicable to permissioned or public blockchains. This means that applications may be added to the network without the approval or trust of others, using the blockchain as a transport layer. Conversely, permissioned (e.g., private) blockchains use an access control layer to govern who has access to the network. The embodiments further provide access controls for entities within or external to a private or public blockchain. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

FIG. 6 is a diagram of another example architecture according to some example implementations.

In this example, the host organization 510 which includes the hosted computing environment 511 having a processors and memory (e.g., within the execution hardware, software, and logic 520 of the database system 530) which serve to operate the blockchain services interface 590 including the blockchain consensus manager and blockchain metadata definition manager 596. There is additionally depicted an index 616 which provides addressing capabilities for data, metadata, and records which are written to, or transacted onto the blockchain 699. Additionally, depicted is the blockchain metadata definition manager 596, which enables the blockchain services interface 590 to define and create metadata which is then pushed to and transacted onto a blockchain which is interfaced via the blockchain services interface. For instance, via the blockchain metadata definition manager 596, it is possible to for any customer organization 505A-C of the host organization to define and create metadata which is then recorded or transacted onto the blockchain for use by that customer organization 505A-C and for use by other participating nodes on the blockchain, regardless of whether or not those participating nodes 533 are also customer organizations 505A-C with the host organization 510. For example, once metadata is defined and created via the blockchain metadata definition manager 596 and pushed onto the blockchain, any participating node 533 with access to the blockchain where that metadata definition resides can then create data records and store information onto the blockchain which adopts the defined metadata definition and thus complies with the newly created metadata definition. In such a way, all participating nodes can utilize information which is stored in compliance with the newly created metadata definition, as there is a standardized and customizable manner for storing such data.

According to certain implementations, the blockchain metadata definition manager 596 additionally permits non-subscribers (e.g., entities which are not customer organizations 505A-C) of the host organization to nevertheless utilize the blockchain metadata definition manager 596 and graphical user interfaces (GUIs) associated with the blockchain metadata definition manager 596 via an exposed API interface for such non-subscribing customers which may then create and define metadata definitions which are then pushed onto the blockchain via the host organization's blockchain services interface 590.

According to certain implementations, blockchain metadata definition manager 596 as shown here may utilize a specific blockchain implementation which is provided by the host organization 510 and thus, for which the applicable blockchain protocol is defined by the host organization 510 or alternatively, the blockchain metadata definition manager 596 may utilize any publicly accessible blockchain for which the host organization operates as a participating node so as to establish access or the blockchain metadata definition manager 596 may utilize a private blockchain, including those which are not provided by the host organization 510, so long as the host organization is able to authenticate with such a private blockchain and access the blockchain by operating as a participating node on the private blockchain.

As will be described in greater detail below, the blockchain metadata definition manager 596 implements a specialized metadata definition and creation scheme which may include the use of GUIs and other user-friendly interfaces which are provided by the host organization either via an API or via an interface of the host organization, such as the web-server 575 via which users and customer organizations may interact with the host organization and more particularly, with the services and applications provided by the host organization, including use of GUIs provided by the blockchain metadata definition manager 596 which is made accessible to tenants of the host organization via the cloud computing platform and in certain embodiments made available to non-tenants and non-subscribers of the host organization 510, either of which may then utilize the GUIs and functionality provided by the blockchain metadata definition manager 596.

It may be necessary in accordance with certain embodiments that a customized blockchain protocol implementation be provided by the host organization to support use of the specialized metadata definition and creation scheme as implemented by the blockchain metadata definition manager 596, however, in embodiments where the metadata may permissibly be defined and stored onto a blockchain by the host organization 510, then any blockchain utilized to store such data will be otherwise unaffected as the blockchain is agnostic as to what types of metadata is defined or created and transacted onto the blockchain by the host organization. Stated differently, while the host organization 510 facilitates the definition and creation of such metadata and transacts that information onto a blockchain, it is immaterial to the blockchain as to what applications elect to utilize such data, whereas the host organization facilitates a platform in which applications may elect to only utilize data which is in compliance with the defined and created metadata, thus permitting transferability of such data, as well as many other benefits.

As shown, the index 616 is stored within the database system 530 of the host organization, however, the Merkle tree index 616 may alternatively be written to and stored on the blockchain itself, thus enabling participating nodes with the blockchain which lack access to the query interface 580 of the host organization to nevertheless be able to retrieve the Merkle tree index 616 (when stored on the blockchain) and then use an address retrieved from the Merkle tree index 616 to directly reference an addressable block on the blockchain to retrieve the desired record, data, or metadata, without having to traverse the entire blockchain or search the blockchain for the needed record.

As depicted, there is another index 616 depicted as being shown within the last standard block 542 of the blockchain 699. Only one index 616 is required, but the index 616 may permissibly be stored in either location.

The Merkle tree index 616 depicted in greater detail at the bottom shows a level 0 Merkle root having a hash of ABCDE, followed by a hash layer with two hash nodes, a first with hash ABC and a second with a hash DE, followed by the data blocks within the data leafs identified by hash A, B, C, D, and E, each containing the addressing information for the addressable blocks on the blockchain.

Storing data and metadata on the blockchain 699 in conjunction with the use of a Merkle tree index 616 is much more efficient than previously known data storage schemes as it is not necessary to search through multiple blocks 541 and 542 of the blockchain to retrieve a data record. Rather, the index 616 is first searched to retrieve an address for the desired block, which is very fast and efficient, and then using the retrieved address from the index 616, the record is retrieved directly from the addressable block on the blockchain 699.

As data is stored within a blockchain using conventional techniques, the amount of data in the blockchain explodes in terms of total volume of stored data creating scalability problems and resulting in problematic inefficiencies. The total volume of data stored to a blockchain tends to explode or grow unsustainably over time because every time a stored record is updated or modified, it is necessary to re-write the entirety of the modified record back to the blockchain which then becomes the most recent and up-to-date record, however, all prior versions and copies are retained within the blockchain, thus resulting in significant duplicative data entries being stored. The benefit to such an approach is that an entire record may be retrieved from a single block on the blockchain, without having to refer back to prior blocks on the blockchain for the same record. But such a storage scheme is highly inefficient in terms of storage.

Alternatively, only a modification to a record stored within the blockchain may be stored, in accordance with conventional approaches, thus resulting in the modified data being written into a new block on the blockchain, with the non-modifiable data being retrievable from a prior block of the blockchain. This approach reduces the total amount of data stored by the blockchain. Unfortunately, any data retrieval of a modified record requires the inspecting and retrieval from multiple blocks on the blockchain, thus mitigating the data redundancy and unsustainable growth problem, but trading that problem for an undesirable data retrieval inefficiency problem.

In such a way, data management for records and information stored within the blockchain 699 is improved. Moreover, metadata may additionally be stored within the blockchain to provide additional information and context regarding stored records, with each of the data records and the metadata describing such data records being more easily retrievable through the use of the index 616. Such metadata permits a business or other entity to transform the data record retrieved from the blockchain back into a useable format much easier than with conventional approaches which lose such context and metadata for any record written to the blockchain.

Figure 7:
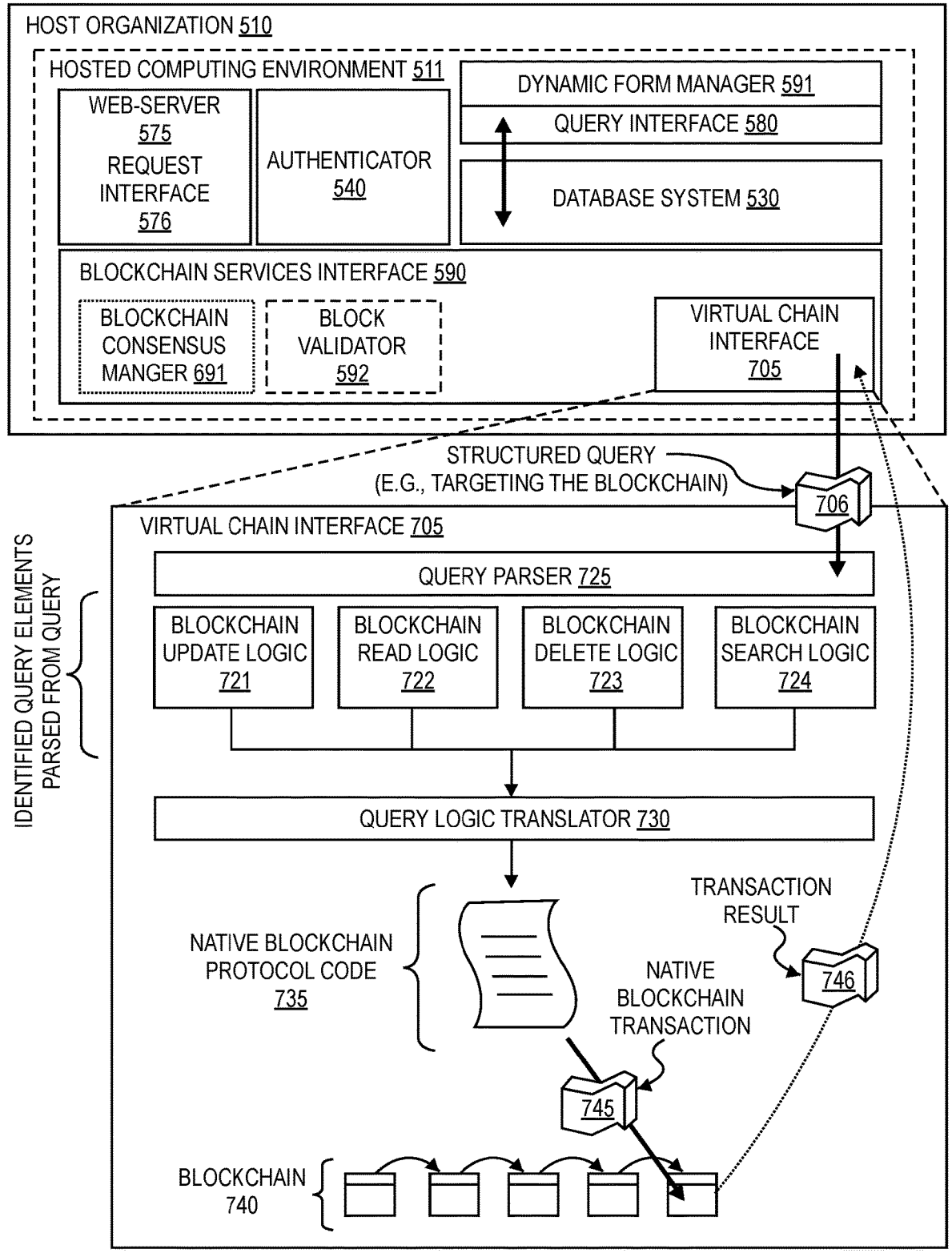
FIG. 7 is a diagram of another example architecture with virtual chaining according to some example implementations.

FIG. 7 is a block diagram of an architecture supporting virtual chain interface to retrieve data from a decentralized data management system to generate a set of virtual objects representing the retrieved data.

FIG. 7 depicts another exemplary architecture 700, with additional detail of a virtual chain model utilized to interface with for distributed ledger technologies via a cloud based computing environment, in accordance with described embodiments.

Depicted here is the host organization and its various elements as described previously, however, there is further depicted a virtual chain interface 705 within the blockchain services interface 590 which provides an alternative programmatic interface to support blockchain protocol implementations, be they public blockchains upon which the host organization operates as a participating node, or public blockchain protocol implementations provided by the host organization 510 or private blockchains provided by the host organization 510.

Developers utilizing distributed ledger technologies to interface with private and public blockchains conventionally were required to utilize the native programming language of those blockchains, rather than having the ability to utilize the programming language of their own choosing. This requirement creates some difficulty for developers who may be required to program using languages with which they have far less familiarity, thus inhibiting use of blockchain technologies.

Within the host organization 510, it is very common for developers to interact with the database system 530 via the query interface 580 utilizing a structured query language, such as SQL or PL/SOQL.

It is therefore in a accordance with the described embodiments that the host organization 510 provides the ability to interact with a blockchain through the virtual chain interface 705 utilizing syntax similar to a normal SQL query ordinarily utilized to query a relational database.

As depicted here, the virtual chain interface 705 is able to receive a structured query 706 from a user targeting the blockchain and then route the structured query 706 through a query parser 725 which breaks down the elements of the structured query 706. For instance, the query parser 725 as depicted here breaks down the structured query 706 into blockchain update logic 721, blockchain read logic 722, blockchain delete logic 723 (e.g., equivalent to removing a row from a database), and blockchain search logic 724, resulting in the identified query elements being parsed from the structured query received at the virtual chain interface 705 from the user.

The identified query elements are then mapped to corresponding native blockchain functions, code, or logic by the query logic translator 730 so as to result in native blockchain protocol code 735 constituting the equivalent functionality of the structured query 706 and thus resulting in the native blockchain transaction 745 which is then transacted onto the blockchain 740 triggering the return of the transaction result to the virtual chain interface.

According to one embodiment, the virtual chain interface 705 provides a virtual table or a list of entries and conversions which mimic the blockchain, thus permitting a mapping, conversion, or translation of operational elements within the structured query 706 to be replaced with native blockchain code or functions, based on the virtual table.

Once the functional elements are converted from the incoming structured query into the native blockchain functions, the resulting native blockchain transaction is simply executed via the blockchain, for instance, by broadcasting the transaction, writing the transaction into a block of the blockchain, validating the block, and then committing the validated block to the blockchain.

According to one embodiment, the structured query 706 received at the virtual chain interface is written using standard SQL syntax, however, behind the scenes and invisible to the user, the virtual chain interface 705 identifies the contextually relevant information based on the user and the structured query elements utilized to generate a properly formed transaction for the blockchain.

Consider for instance a received structured query 706 which provides an SQL INSERT statement. Normally, the syntax would be INSERT INTO table_name (column1, column2, column3, . . . ), however, the virtual chain interface will translate the INSERT command into an appropriate native blockchain command. The commands are different depending on the blockchain protocol and interface script being utilized, but one such command to insert data onto a blockchain is OP RETURN <the data you want to add> and therefore, the INSERT is converted to an OP RETURN the INTO is converted into a targeted location such as metadata, contracts, blockchain asset, etc., which may be identified automatically by the virtual chain interface's understanding of the user's context submitting the structured query as the submitter will be associated with specific blockchain elements.

Similarly, if the user presents a structured query 706 specifying an UPDATE command, then it is necessary to convert the UPDATE command into a relevant command for the blockchain since the immutable nature of the blockchain means that no accepted block in the chain can ever be modified. Consequently, an UPDATE command of a structured query 706 must be converted to an add. Therefore, where a user specifies, for example, UPDATE table_name, SET_column1=value1, column2=value2, . . . , WHERE condition, the virtual chain interface will translate the incoming structured query elements into an insert block command as well as populate the necessary user management, including, for example, adding the necessary user keys and any other formalities required to transact with the blockchain.

For example, while the host organization operates as node on the blockchain and therefore has access to data within the blockchain, it is necessary for blockchain transactions to be performed from the appropriate participating node where data is being added or modified (e.g., via a new add which supersedes old data). Therefore, the virtual chain interface additionally maps the user ID or requestor of the structured query 706 to a participating node and transacts the native blockchain transaction from a participating node corresponding to the user ID or the requestor of the incoming structured query 706.

Similarly, where a user specifies via the structured query a SELECT FROM command, such as specifying, SELECT column1, column2, . . . FROM table_name, then the virtual chain interface will attain translate the query elements to the appropriate blockchain native protocol code required to retrieve data from the blockchain, including translating or mapping the table_name field to an appropriate blockchain asset, metadata, or other readable storage location. For instance, if the structured query specifies an object, then the virtual chain interface will translate the target object name to the corresponding blockchain asset from which the blockchain's payload data may then be read and returned in reply to the structured query.

From a user or customer perspective, structured queries may thus be programmed within applications, reports, and ad-hoc targeting a specified blockchain distributed ledger for which the user or customer has a participating node, and the virtual chain interface will transparently handle the conversion of the structured query to the requisite native blockchain protocol code 735 without requiring further involvement or technical know-how from the user.

According to described embodiments, each tenant of the host organization having data stored within a specified blockchain will have at least one participating node with the blockchain, however, certain tenants of the host organization may have multiple participating nodes on a single blockchain.

For example, a tenant of the host organization having multiple different products or product lines may elect to have distinct participating nodes with the blockchain for each product or product line, and therefore, the "table_name" referenced by a structured query is mapped to the appropriate participating node and blockchain asset for the tenant, where more than one exists. In another embodiment, a single tenant of the host organization may have multiple customer organizations, and therefore, such a tenant may organize each customer organization into its own participating node with the blockchain, in which case the virtual chain interface will map the designated table name or object within a structured query 706 to a participating node with the blockchain based on the OrgID for the tenant being used to submit the structured query.

In other embodiments, a single tenant may utilize multiple different blockchains, and therefore, the virtual chain interface needs to map the specified table name or object to a targeted blockchain, as well as to the participating node and blockchain asset with the targeted blockchain. Consider for example Walmart as a tenant of the host organization which utilizes a financial private blockchain to store financial related information and utilizes a different blockchain, such as a private shipping blockchain, to store supply chain data. In such an event, Walmart would be a participating on each of the financial private blockchain and the private shipping blockchain, and thus, Walmart would have at least those two participating nodes. Consequently, the virtual chain interface must map any specified table name or storage location specified by a SQL command to the appropriate blockchain and the participating node and blockchain asset with the targeted blockchain.

In such a way, users, customer organizations, and tenants can issue commands such as "SELECT FROM" this "OBJECT" or "INSERT BLOCK" or "UPDATE BLOCK" without having to understand the native blockchain protocol code as the translation is handled by the virtual chain interface 705 on behalf of the user. Moreover, because the user is authenticated with the host organization, the virtual chain interface also handles all the backend administration required to transact with the blockchain, such as providing and automatically populating the requisite asset ID, etc.

Upon the very first transaction, the virtual chain interface will need to perform an insert command into the blockchain to create a new participating node, however, once created, the existing participant may be used from then forward as the entries within the blockchain are never removed. For instance, if the user has never conducted a transaction on the target blockchain, then the virtual chain interface will handle the administrative tasks to create a participant in the blockchain based on that user's credentials and then generate a key for that user for use with the blockchain, as all transactions are based on the key. Once complete, then the virtual chain interface will translate the structured query into a statement referred to as the asset payload of blockchain based on the mapping.

According to certain embodiments, the virtual chain interface additionally handles synchronization with the blockchain, for instance, recognizing the difference between pending transactions on the blockchain for which consensus has not yet been reached versus those validated transactions having consensus may therefore be considered as committed transactions to the blockchain. For example, where a pending transaction is submitted but never reaches consensus the virtual chain interface will handle the equivalent of a roll-back transaction. In SQL, a "ROLLBACK" is a command that causes all data changes since the last BEGIN WORK or START TRANSACTION to be discarded by the relational database management systems (RDBMS), so that the state of the data is "rolled back" to the way it was before those changes were made. Similarly, a transaction broadcast to the blockchain participating nodes which is written to a block which is subsequently invalidated, truncated, or ignored, in favor of a different block (e.g., on the basis of consensus, proof of work, etc.) will result in the broadcast transaction being effectively nullified, and thus, the virtual chain interface 705 tracks the status and reflects such a failed condition so as to maintain synchronization between the blockchain and the structured query requestor.

For instance, information is returned to the user submitting a structured query that the query reads from, updates, or in some way affects a pending transaction. Upon submitting such a query, the user will be presented with information indicating that the transaction has been posted but is on pending commit.

Once the transaction is committed into the blockchain, only then will the user see that it can be retrieved as a committed transaction versus being retrievable only as a pending/non-committed transaction.

The virtual chain interface 705 additionally supports smart contracting with the blockchain such that if a defined event occurs within a transaction on the blockchain, then the entire smart contract will be executed via the blockchain. The virtual chain interface 705 will automatically listen to specified events and then perform pre-defined actions when those events are observed to occur on the blockchain.

Consider for example the SQL SELECT FROM statement, which is incompatible with the available blockchain protocols. For instance, where a structured query specifies to SELECT a, b, c FROM, financial_account_B, then the "B" will be interpreted as an identifier within the blockchain. Similarly, a modified dot notation may be utilized, such specifying SELECT "ID" FROM blockchain_financial_account_B will thus interpret the leading "blockchain" as the targeted blockchain to be utilized, with the virtual chain interface identifying the appropriate participating node, and the "B" being interpreted as an identifier with the specified blockchain, in which the identifier represents a specific payload within the blockchain from which to retrieve the data.

The virtual chain interface 705 additionally maintains its mapping by pulling the latest transaction from the blockchain or the latest block from the blockchain for that specific customer across all assets within the blockchain.

According to another embodiment, the virtual chain interface 705 supports retrieval of historical data from the blockchain. For example, for an entity specifying financial_account_history_b, the virtual chain interface 705 will generate native blockchain protocol code to pull all transactions that have ever happened within the specified blockchain for that specified asset, thus returning a series of transactions that have occurred over time. Unlike a database which may overwrite the data after a committed update, the blockchain never discards the information, and therefore, the latest current information may be retrieved or the complete historical information may also be retrieved.

Consider for example, a transaction to add a customer in which the first transaction specifies the customer's first and last name, but is missing the SSN. Then a second transaction specifies the SSN which is added to the blockchain. Then a third transaction updates the contact information for the customer. A fourth transaction then changes the customer's phone number. All of these transactions are applied the same customer asset, however, all four are distinct transactions with the blockchain. Consequently, a structured query may specify SELECT a, b, c from customer_b. in which will result in the latest most up to date information being returned for that customer. However, if instead the structured query specifies SELECT a, b, c from customer_history_b, then the virtual chain interface 705 will retrieve the entire historical record of all changes to the customer_b, such that it may be viewable that the initial entry pursuant to a first transaction was missing SSN and that a fourth transaction resulted in the change to the customer's telephone number, ultimately ending with the latest most up to date information for that blockchain asset.

According to certain embodiments, the virtual chain interface 705 handles all mapping automatically between the parsed structured query elements and the native blockchain protocol code, however, in alternative embodiments, the customer may provide mappings from the customer's information, table names, variables, participant ID, and query elements to the corresponding native blockchain protocol code 735 elements.

For example, the customer may store data within table "X" within the host organization, but when it is going into blockchain, it is mapped to X+Y, which may be user specified. Therefore, the virtual chain interface will map the SQL-type commands to the blockchain data which is called X+Y based on the customer provided mapping. Such mappings may be stored as metadata on behalf of the customer, for instance, within a configuration file which is read by the virtual chain interface.

The customer may have data in the blockchain called ABC, and then wish, for whatever reason, to change the data to A1B1C1. The customer can specify such a mapping and the virtual chain interface will then automatically generate an add asset transaction in the blockchain and put the transaction pending for the user so that the user knows that the transaction is in a pending state and not committed until consensus is reached and sufficient mining has occurred such that the transaction is committed to the blockchain.

Once committed, an event is triggered from blockchain which the host organization's blockchain services interface 590 listens for, at which point the host organization also marks the data as committed, so as to keep the data status synchronized.

Also possible is that consensus is never reached and therefore the transaction fails. Again, the host organization's blockchain services interface 590 listens for the event indicating failure of the transaction, at which point the host organization marks the transaction as failed and the virtual chain interface performs any necessary rollback operation so as to maintain synchronization.

It is also feasible that some other participating node adds updated information to the blockchain superseding old data for an asset. When the data is refreshed by any participating node, including being read by the virtual chain interface pursuant to a structured query requesting the data to be retrieved, the latest value will be retrieved, regardless of what entity updated the value. Because the data is stored within a distributed ledger, any participating node specifying the correct key may submit a transaction to update the blockchain asset according to such an embodiment.

According to another embodiment, the host organization's blockchain services interface 590 listens for any event or change to specified blockchain assets, upon which an event will be triggered, such that a user requesting notification pertaining to changes to a specified asset will be notified by the host organization, without having to go and retrieve the data to and check to determine if changes have been made.

For instance, as part of the transaction management performed by the virtual chain interface, whenever an asset is created in the blockchain, the blockchain services interface 590 keeps the blockchain asset ID with the Salesforce ID together so that commit and non-commit status can be tracked. Therefore, the blockchain asset ID with the Salesforce ID for that particular asset can also be monitored for any changes by another entity.

According to certain embodiments, the data within the blockchain asset is available within the host organization via the participating node of the host organization, and therefore, the latest copy is always available to the host organization from the distributed ledger, assuming the data has been committed.

According to one embodiment, a user that authenticates with the host organization will result in the virtual chain interface contextually mapping that user's host organization identifier to a cryptographic ID utilized by the blockchain. In such a way, the user need not know or provide the cryptographic ID as it will be supplied for all transactions by the virtual chain interface 705.

Figure 8:
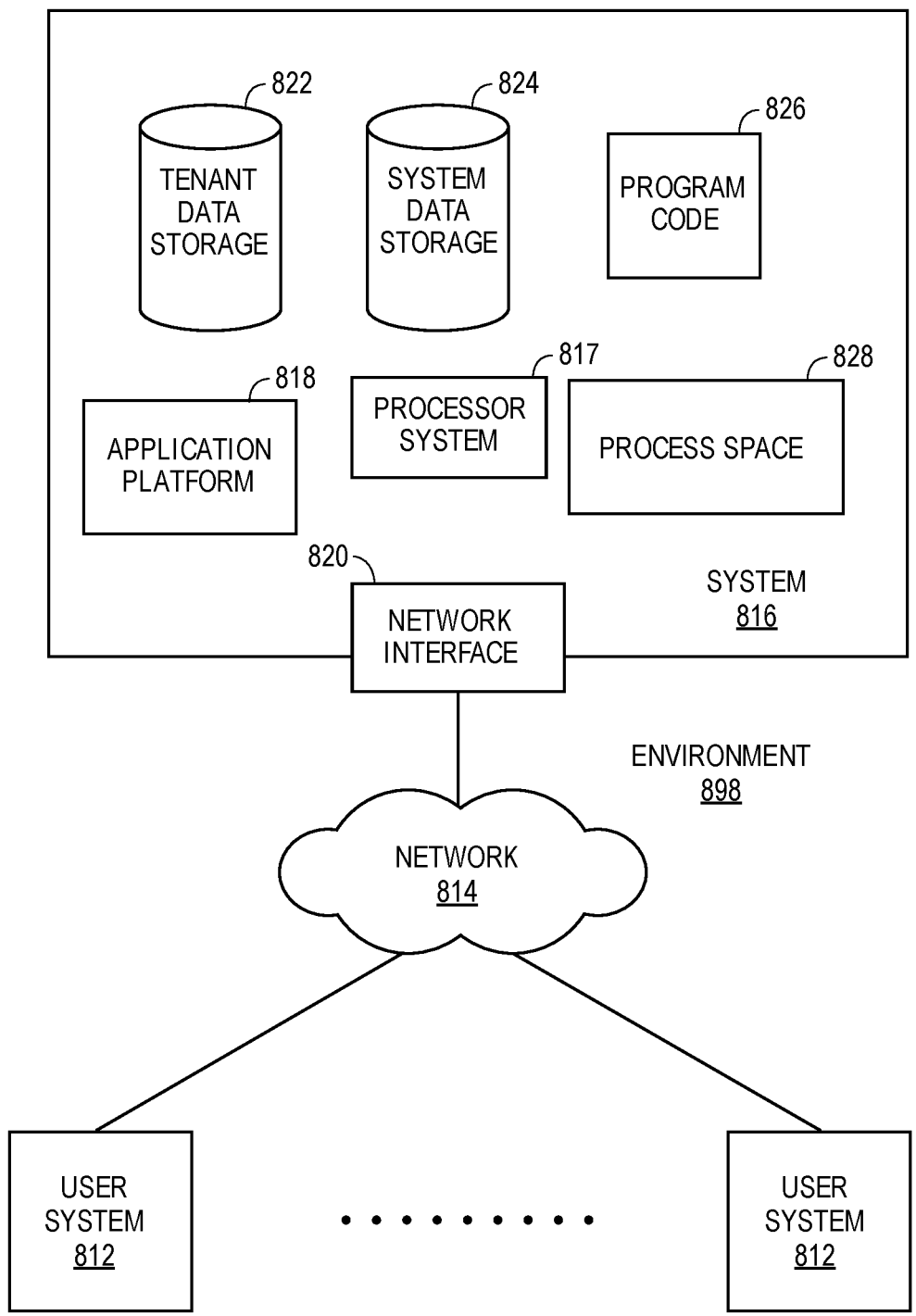
FIG. 8 is a block diagram of an environment in which an on-demand database service may operate in accordance with the described embodiments.

FIG. 8 is a block diagram of an environment in which an on-demand database service may operate in accordance with the described embodiments. Environment 898 may include user systems 812, network 814, system 816, processor system 817, application platform 818, network interface 820, tenant data storage 822, system data storage 824, program code 826, and process space 828. In other embodiments, environment 898 may not have all of the components listed and/or may have other elements instead of, or in addition to, those listed above.

Environment 898 is an environment in which an on-demand database service exists. User system 812 may be any machine or system that is used by a user to access a database user system. For example, any of user systems 812 may be a handheld computing device, a mobile phone, a laptop computer, a workstation, and/or a network of computing devices. As illustrated in FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" is used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a verification system. For example, in one embodiment, system 1816 includes application servers configured to implement and execute verification services software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, verification services. For example, system 816 may provide tenant access to multiple hosted (standard and custom) applications, including verification services application. User (or third party developer) applications, which may or may not include verification services, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 may include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device may be used to access data and applications hosted by system 816, and to perform searches on stored data, and otherwise allows a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units.

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9:
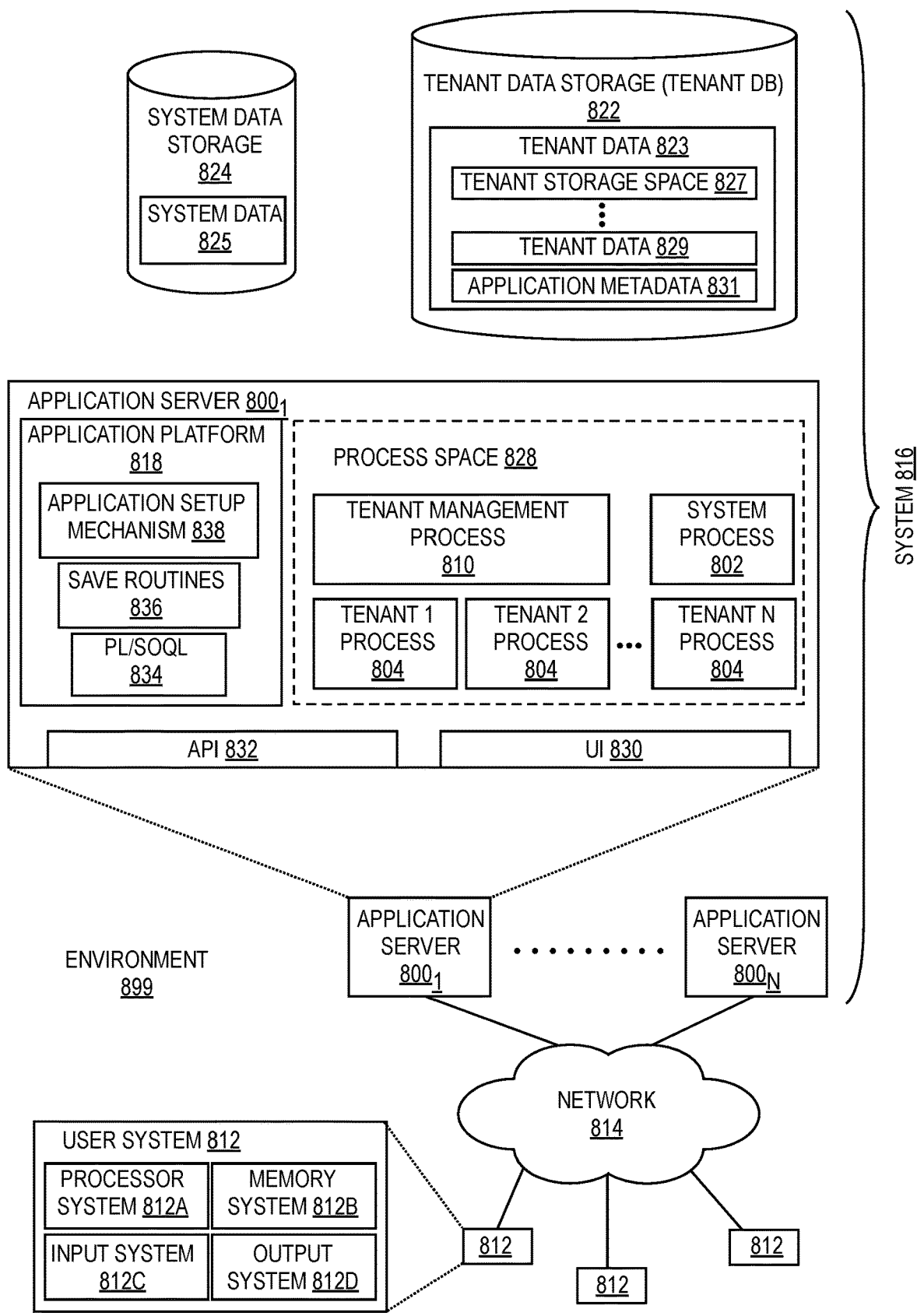
FIG. 9 is another block diagram of an environment in which an on-demand database service may operate in accordance with the described embodiments.

FIG. 9 is another block diagram of an environment in which an on-demand database service may operate in accordance with the described embodiments. User system 812 may include a processor system 812A, memory system 812B, input system 812C, and output system 812D. FIG. 9 shows network 814 and system 816. FIG. 9 also shows that system 816 may include tenant data storage 822, having therein tenant data 823, which includes, for example, tenant storage space 827, tenant data 829, and application metadata 831. System data storage 824 is depicted as having therein system data 825. Further depicted within the expanded detail of application servers $800_{1-N}$ are User Interface (UI) 830, Application Program Interface (API) 832, application platform 818 includes PL/SOQL 834, save routines 836, application setup mechanism 838, process space 828 includes system process space 802, tenant 1-N process spaces 804, and tenant management process space 810. In other embodiments, environment 899 may not have the same elements as those listed above and/or may have other elements instead of, or in addition to, those listed above.

User system 812, network 814, system 816, tenant data storage 822, and system data storage 824 were discussed above in FIG. 8. As shown by FIG. 9, system 816 may include a network interface 820 (of FIG. 8) implemented as a set of HTTP application servers 800, an application platform 818, tenant data storage 822, and system data storage 824. Also shown is system process space 802, including individual tenant process spaces 804 and a tenant management process space 810. Each application server 800 may be configured to tenant data storage 822 and the tenant data 823 therein, and system data storage 824 and the system data 825 therein to serve requests of user systems 812. The tenant data 823 might be divided into individual tenant storage areas (e.g., tenant storage space 827), which may be either a physical arrangement and/or a logical arrangement of data. Within each tenant storage space 827, tenant data 829, and application metadata 831 might be similarly allocated for each user. For example, a copy of a user's most recently used (MRU) items might be stored to tenant data 829. Similarly, a copy of MRU items for an entire organization that is a tenant might be stored to tenant storage space 827. A UI 830 provides a user interface and an API 832 provides an application programmer interface into system 816 resident processes to users and/or developers at user systems 812. The tenant data and the system data may be stored in various databases, such as one or more Oracle™ databases.

Application platform 818 includes an application setup mechanism 838 that supports application developers' creation and management of applications, which may be saved as metadata into tenant data storage 822 by save routines 836 for execution by subscribers as one or more tenant process spaces 804 managed by tenant management process space 810 for example. Invocations to such applications may be coded using PL/SOQL 834 that provides a programming language style interface extension to API 832. Invocations to applications may be detected by one or more system processes, which manages retrieving application metadata 831 for the subscriber making the invocation and executing the metadata as an application in a virtual machine.

Each application server 800 may be communicably coupled to database systems, e.g., having access to system data 825 and tenant data 823, via a different network connection. For example, one application server $800_1$ might be coupled via the network 814 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 812 to distribute requests to the application servers 800. In one embodiment, the load balancer uses a least connections algorithm to route user requests to the application servers 800. Other examples of load balancing algorithms, such as round robin and observed response time, also may be used. For example, in certain embodiments, three consecutive requests from the same user may hit three different application servers 800, and three requests from different users may hit the same application server 800. In this manner, system 816 is multi-tenant, in which system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 800 to request and update system-level and tenant-level data from system 816 that may require sending one or more queries to tenant data storage 822 and/or system data storage 824. System 816 (e.g., an application server 800 in system 816) automatically generates one or more SQL statements (e.g., one or more SQL queries) that are designed to access the desired information. System data storage 824 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10:
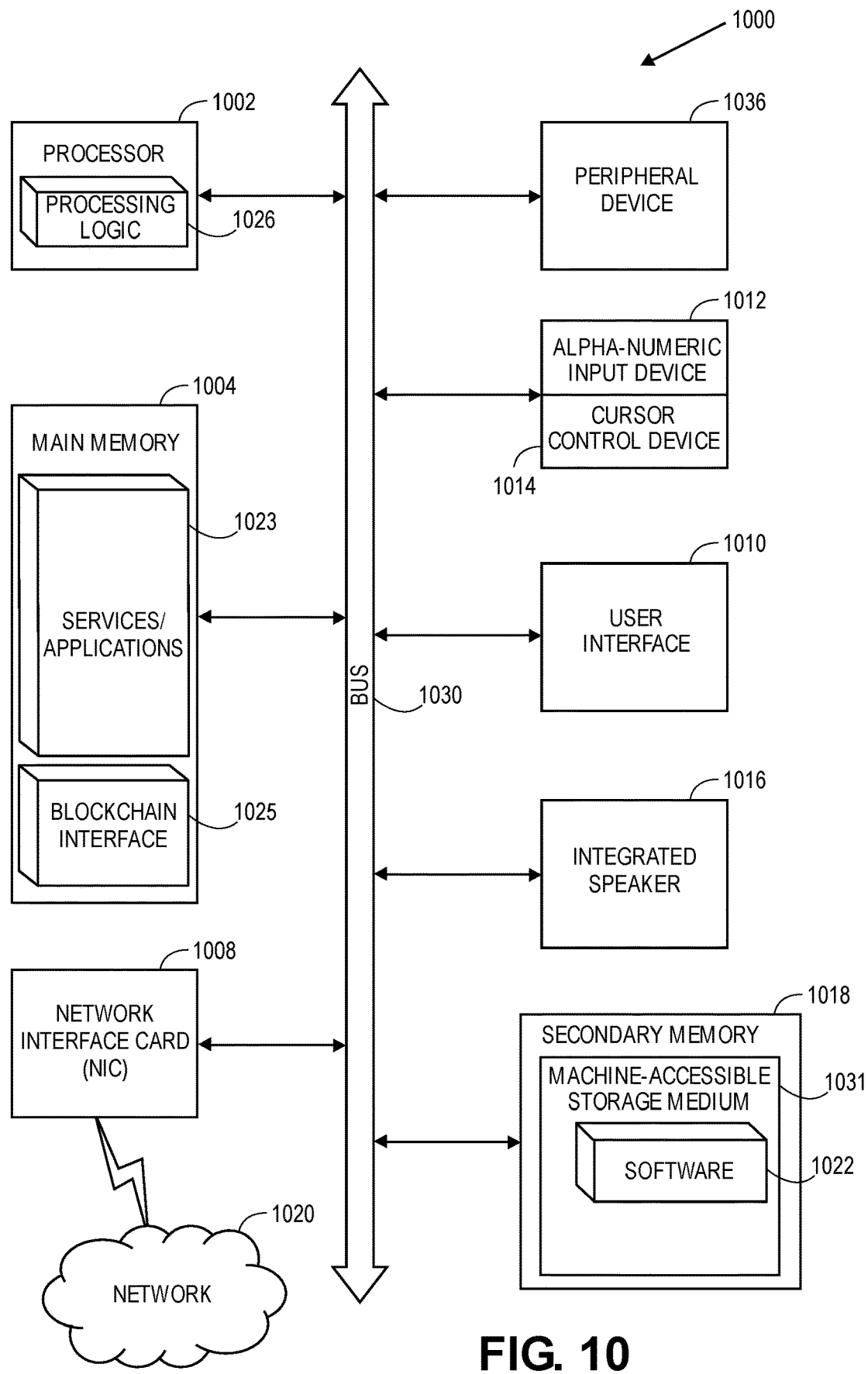
FIG. 10 is a diagram of a machine in the example form of a computer system, in accordance with some embodiments.

FIG. 10 is a diagram of a machine in the example form of a computer system, in accordance with some embodiments. Machine 1000 in the exemplary form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes blockchain verification services or applications 1023. Other blockchain interface 1025 functions can also be stored in the main memory 1004. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Example Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface (s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 11A:
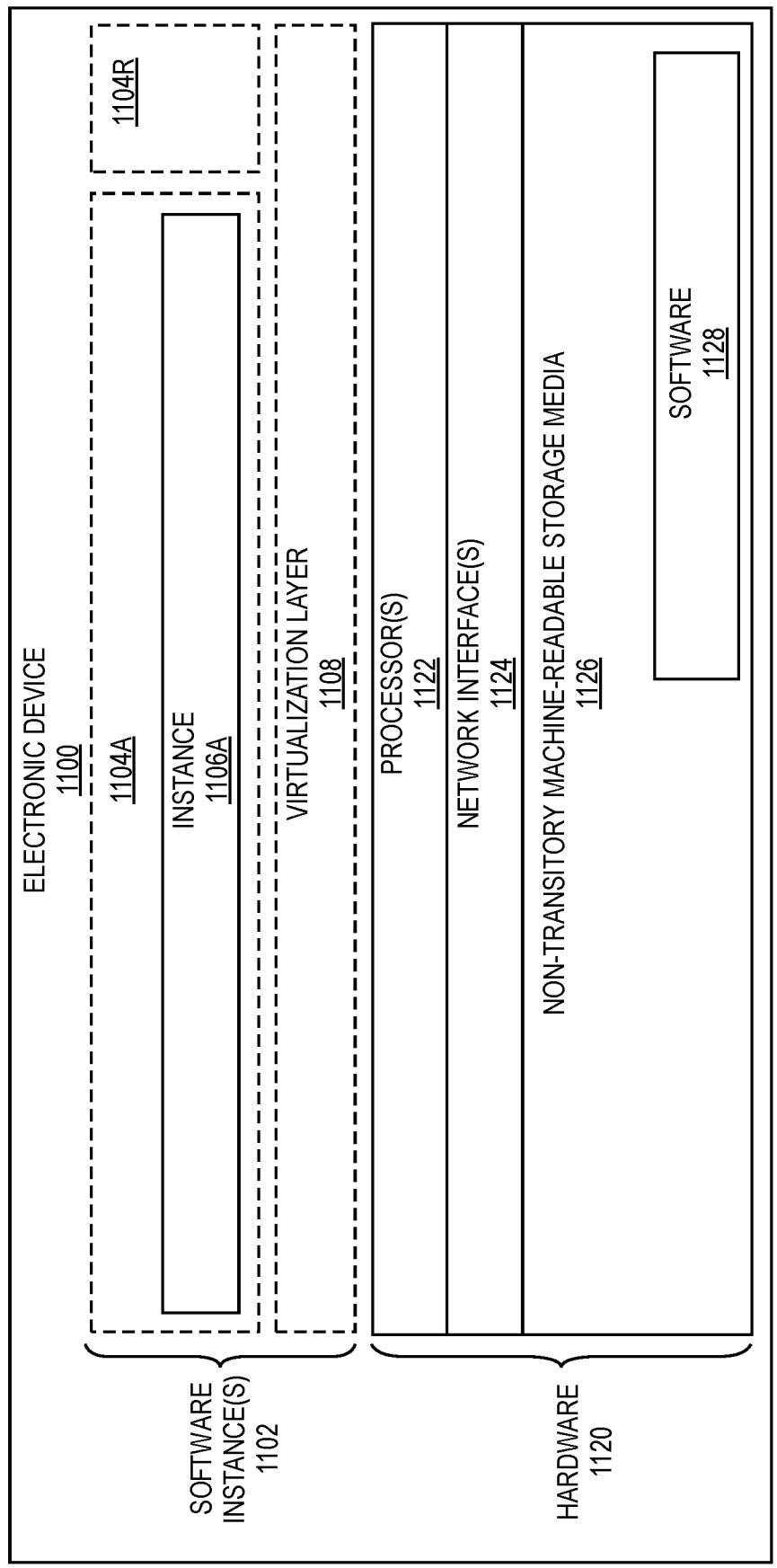
FIG. 11A is a block diagram illustrating an electronic device according to some example implementations.

FIG. 11A is a block diagram illustrating an electronic device 1100 according to some example implementations. FIG. 11A includes hardware 1120 comprising a set of one or more processor(s) 1122, a set of one or more network interfaces 1124 (wireless and/or wired), and non-transitory machine-readable storage media 1126 having stored therein software 1128 (which includes instructions executable by the set of one or more processor(s) 1122). Each of the previously described tenant application and the dynamic form manager service may be implemented in one or more electronic devices 1100. In one implementation: 1) each of the end user clients is implemented in a separate one of the electronic devices 1100 (e.g., in user electronic devices operated by users where the software 1128 represents the software to implement end user clients to interface with the dynamic form manager service (e.g., a web browser, a native client, a portal, a command-line interface, and/or an application program interface (API) based upon protocols such as Simple Object Access Protocol (SOAP), Representational State Transfer (REST), etc.)); 2) the dynamic form manager service is implemented in a separate set of one or more of the electronic devices 1100 (e.g., a set of one or more server electronic devices where the software 1128 represents the software to implement the dynamic form manager service); and 3) in operation, the electronic devices implementing the end user clients and the dynamic form manager service would be communicatively coupled (e.g., by a network) and would establish between them (or through one or more other layers) connections for submitting data access and modification request to the dynamic form manager service and returning a user interface with requested data to the end user clients. Other configurations of electronic devices may be used in other implementations (e.g., an implementation in which the end user client and the dynamic form manager service are implemented on a single electronic device 1100).

In electronic devices that use compute virtualization, the set of one or more processor(s) 1122 typically execute software to instantiate a virtualization layer 1108 and software container(s) 1104A-R (e.g., with operating system-level virtualization, the virtualization layer 1108 represents the kernel of an operating system (or a shim executing on a base operating system) that allows for the creation of multiple software containers 1104A-R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1128 (illustrated as instance 1106A) is executed within the software container 1104A on the virtualization layer 1108. In electronic devices where compute virtualization is not used, the instance 1106A on top of a host operating system is executed on the "bare metal" electronic device 1100. The instantiation of the instance 1106A, as well as the virtualization layer 1108 and software containers 1104A-R if implemented, are collectively referred to as software instance(s) 1102.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 11B:
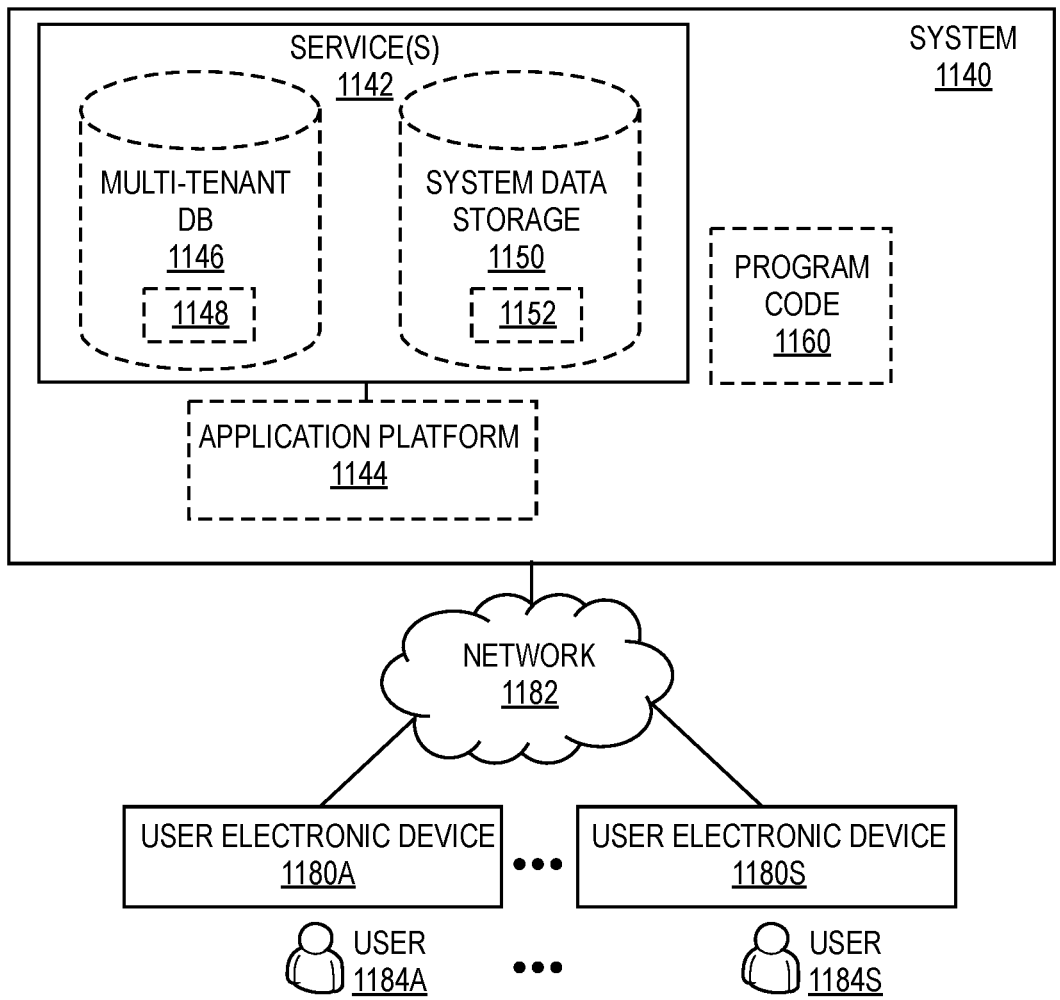
FIG. 11B is a block diagram of an environment where a dynamic form manager may be deployed, according to some implementations.

FIG. 11B is a block diagram of an environment where a dynamic form manager may be deployed, according to some implementations. A system 1140 includes hardware (a set of one or more electronic devices) and software to provide service(s) 1142, including the dynamic form manager service. The system 1140 is coupled to user electronic devices 1180A-S over a network 1182. The service(s) 1142 may be on-demand services that are made available to one or more of the users 1184A-S working for one or more other organizations (sometimes referred to as outside users) so that those organizations do not need to necessarily be concerned with building and/or maintaining a system, but instead makes use of the service(s) 1142 when needed (e.g., on the demand of the users 1184A-S). The service(s) 1142 may communication with each other and/or with one or more of the user electronic devices 1180A-S via one or more Application Programming Interface(s) (APIs) (e.g., a Representational State Transfer (REST) API). The user electronic devices 1180A-S are operated by users 1184A-S.

In one implementation, the system 1140 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1140 may include an application platform 1144 that enables PAAS for creating, managing, and executing one or more applications developed by the provider of the application platform 1144, users accessing the system 1140 via one or more of user electronic devices 1180A-S, or third-party application developers accessing the system 1140 via one or more of user electronic devices 1180A-S.

In some implementations, one or more of the service(s) 1142 may utilize one or more multi-tenant databases 1146 for tenant data 1148, as well as system data storage 1150 for system data 1152 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user electronic device 1180A-S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the one or more multi-tenant database 1146 and/or system data storage 1150.

In some implementations, the service(s) 1142 are implemented using virtual applications dynamically created at run time responsive to queries from the user electronic devices 1180A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the dynamic form manager service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1140 and the user electronic devices 1180A-S.

Each user electronic device 1180A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1140. For example, the user interface device can be used to access data and applications hosted by system 1140, and to perform searches on stored data, and otherwise allow a user 1184 to interact with various GUI pages that may be presented to a user 1184. User electronic devices 1180A-S might communicate with system 1140 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1180A-S might include an HTTP client, commonly referred to as a "browser," for sending and receiving HTTP messages to and from server(s) of system 1140, thus allowing users 1184 of the user electronic device 1180A-S to access, process and view information, pages and applications available to it from system 1140 over network 1182.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of generating a user interface with information from a decentralized data management system and information from a centralized data management system, the method comprising:
retrieving a layout for the user interface;
determining metadata for the decentralized data management system;
requesting the information from the centralized data management system identified by the layout via a query;
accessing the information from the decentralized data management system by indexing; and
generating and populating the user interface with the information from the centralized data management system and the decentralized data management system.

2. The method of generating the user interface of claim 1, wherein the layout is retrieved from the centralized data management system.

3. The method of generating the user interface of claim 1, wherein the decentralized data management system is a blockchain.

4. The method of generating the user interface of claim 1, wherein the indexing is via partial Merkle trie tree indexing.

5. The method of generating the user interface of claim 1, further comprising:
populating a set of virtual objects with the information from the decentralized data management system.

6. The method of generating the user interface of claim 1, further comprising:
populating a set of entity objects with the information from the centralized data management system.

7. The method of generating the user interface of claim 5, wherein the set of virtual objects include fields referencing related entity objects.

8. The method of generating the user interface of claim 1, further comprising:
updating data fields of the user interface by user interaction with the user interface to move information from a centralized data management system to the decentralized management system.

9. The method of generating the user interface of claim 1, further comprising:
updating data fields of the user interface by user interaction with the user interface to move information from a decentralized data management system to the centralized management system.

10. A non-transitory machine-readable storage medium that provides instructions that, if executed by a processor, will cause said processor to perform operations for generating a user interface with information from a decentralized data management system and information from a centralized data management system comprising:
retrieving a layout for the user interface;
determining metadata for the decentralized data management system;
requesting the information from the centralized data management system identified by the layout via a query;
accessing the information from the decentralized data management system by indexing; and
generating and populating the user interface with the information from the centralized data management system and the decentralized data management system.

11. The non-transitory machine-readable storage medium of claim 10, wherein the layout is retrieved from the centralized data management system.

12. The non-transitory machine-readable storage medium of claim 10, wherein the decentralized data management system is a blockchain.

13. The non-transitory machine-readable storage medium of claim 10, wherein the indexing is via partial Merkle trie tree indexing.

14. The non-transitory machine-readable storage medium of claim 10, the operations further comprising:
populating a set of virtual objects with the information from the decentralized data management system.

15. The non-transitory machine-readable storage medium of claim 10, the operations further comprising:
populating a set of entity objects with the information from the centralized data management system.

16. The non-transitory machine-readable storage medium of claim 14, wherein the set of virtual objects include fields referencing related entity objects.

17. The non-transitory machine-readable storage medium of claim 10, the operations further comprising:
updating data fields of the user interface by user interaction with the user interface to move information from a centralized data management system to the decentralized management system.

18. The non-transitory machine-readable storage medium of claim 10, further comprising:
updating data fields of the user interface by user interaction with the user interface to move information from a decentralized data management system to the centralized management system.

19. A computing device to generate a user interface with information from a decentralized data management system and information from a centralized data management system, the computing device comprising:
a non-transitory machine-readable storage medium having a dynamic form manager stored therein; and
a processor coupled to the non-transitory machine-readable storage medium, the processor to execute the dynamic form manager, the dynamic form manager to retrieve a layout for the user interface, determining metadata for the decentralized data management system, request the information from the centralized data management system identified by the layout via a query, access the information from the decentralized data management system by indexing, and generate and populating the user interface with the information from the centralized data management system and the decentralized data management system.

20. The computing device of claim 19, wherein the layout is retrieved from the centralized data management system.

* * * * *